(12) United States Patent
Ikari et al.

(10) Patent No.: US 6,547,712 B1
(45) Date of Patent: Apr. 15, 2003

(54) METHOD FOR SOLIDIFYING AND SEALING IN A TOXIC SUBSTANCE WITH SULFUR

(75) Inventors: Yoshikatsu Ikari, Tokyo (JP); Takuya Yamato, Tokyo (JP); Chujiro Nishida, Kawasaki (JP); Katsuyoshi Toyofuku, Saga-ken (JP); Toshiyuki Kokubu, Saga-ken (JP)

(73) Assignees: Ikari-Laboratory For Environmental Science Co., Ltd., Tokyo (JP); Nishida Mining Co., Ltd., Kanagawa-ken (JP); Tanaka Iron Works Co., Ltd., Saga-ken (JP)

( * ) Notice: Subject to any disclaimer, the term of this patent is extended or adjusted under 35 U.S.C. 154(b) by 0 days.

(21) Appl. No.: 09/520,001

(22) Filed: Mar. 6, 2000

Related U.S. Application Data

(60) Division of application No. 08/982,469, filed on Dec. 2, 1997, now Pat. No. 6,083,431, which is a continuation-in-part of application No. 08/653,348, filed on May 24, 1996, now abandoned.

(30) Foreign Application Priority Data

May 26, 1995 (JP) .............................................. 7-151113

(51) Int. Cl.$^7$ ................................................ A62D 3/00
(52) U.S. Cl. ...................................................... 588/256
(58) Field of Search .......................... 264/11, 140, 115, 264/915, 109; 588/256

(56) References Cited

U.S. PATENT DOCUMENTS

| | | | |
|---|---|---|---|
| 3,720,609 A | 3/1973 | Smith et al. ................... | 210/59 |
| 3,962,080 A | 6/1976 | Dulin et al. .................... | 210/59 |
| 4,108,677 A | 8/1978 | Valiga .......................... | 106/109 |
| 4,134,775 A | 1/1979 | Schwoegler | |
| 4,342,732 A | 8/1982 | Smith .......................... | 423/242 |
| 4,354,876 A | 10/1982 | Webster ....................... | 106/85 |
| 4,354,942 A | 10/1982 | Kaczur et al. ............... | 210/712 |
| 4,844,815 A | 7/1989 | Ader et al. ................... | 210/751 |
| 5,131,457 A | 7/1992 | Fitzgerald .................... | 165/34 |
| 5,304,706 A | 4/1994 | Hooykaas ................... | 588/252 |
| 5,347,072 A | 9/1994 | Adams ....................... | 588/256 |
| 5,362,319 A | 11/1994 | Johnson ...................... | 106/705 |

FOREIGN PATENT DOCUMENTS

| | | | |
|---|---|---|---|
| CA | 1039003 | 11/1975 | |
| DE | 3707257 A1 | 9/1987 | ................ 588/256 |
| DE | 288099 A | 3/1991 | |
| GB | 972661 | 4/1963 | |
| JP | 4969566 | 7/1974 | |
| JP | 52-3378 | 12/1974 | |
| JP | 52-3378 | 1/1977 | |
| JP | 54118304 | 9/1979 | |
| JP | 5549024 B | 12/1980 | |
| JP | 5759235 B | 12/1982 | |
| JP | 5869769 | 4/1983 | |
| JP | 58178185 | 10/1983 | |
| JP | 5926180 | 2/1984 | |
| JP | 6035298 | 2/1985 | |
| JP | 6115759 B2 | 4/1986 | |
| JP | 6215274 B2 | 4/1987 | |
| JP | 230751 B | 7/1990 | |
| JP | 4-122270 | 4/1992 | |
| JP | 6246253 A | 9/1994 | |
| JP | 6254528 | 9/1994 | |
| JP | 788458 A | 4/1995 | |
| JP | 7-313619 | 5/1995 | |
| JP | 7290024 A | 11/1995 | |
| JP | 83317 A | 1/1996 | |
| JP | 859326 A | 3/1996 | |
| JP | 8-318244 | 12/1996 | |
| JP | 9194737 A | 7/1997 | |
| SU | 761437 B | 9/1980 | |

OTHER PUBLICATIONS

Office Action in JP 10–248842 (Translation).

*Primary Examiner*—Mary Lynn Theisen
(74) *Attorney, Agent, or Firm*—Birch, Stewart, Kolasch & Birch, LLP

(57) ABSTRACT

A method for manufacturing materials solidified with sulfur, comprising the steps of bringing the water content of a mixture of sulfur and a raw material to less than 3% by weight, heating and mixing the mixture of raw materials including molten sulfur at 119 to 159° C., to cause the sulfur to penetrate and encapsulate the raw material that is solid or liquid at the molecular level, thereby preparing a fluid mixture, and, if necessary, then molding the mixture into a desired shape or cooling it into a granular form.

19 Claims, 2 Drawing Sheets

METHOD FOR SOLIDIFYING AND SEALING IN A TOXIC SUBSTANCE WITH SULFUR

This application is a divisional of application Ser. No. 08/982,469, filed on Dec. 2, 1997, now U.S. Pat. No. 6,083,431, which was a Continuation-In-part of application Ser. No. 08/653,348, filed May 24, 1996, now abandoned, the entire contents of which are hereby incorporated by reference.

BACKGROUND OF THE INVENTION

1. Field of the Invention

The present invention generally relates to a method for solidifying and sealing in a toxic substance by using sulfur.

The present invention relates to a method for solidifying and sealing (blocking) in a toxic substance with sulfur, to detoxify that toxic substance. More specifically, the present invention relates to a method of solidifying and sealing in a toxic substance including, but not limited to, organochlorine compounds, such as PCBs, and heavy metals, with sulfur, to detoxify that toxic substance, additionally to obtain therefrom a molded product that may be reusable.

Further, the present invention relates to a method of manufacturing materials made of raw materials particularly waste materials such as slag and/or dust resulting particularly from metal processing such as steel-making, and solidified with sulfur. More particularly, the present invention relates to a method of manufacturing molded materials made of raw materials particularly waste materials such as slag and/or dust resulting particularly from metal processing such as steel-making, and solidified by sulfur.

The term "molded materials" used herein refers collectively to materials molded into various shapes, as well as materials cooled with water or some other method into a granular form, which can be used as is, or later melted and molded into various shapes, for various purposes.

2. Background of the Art

Conventionally, slag and/or dust resulting particularly from metal processing such as steel-making, as well as other waste materials, etc., are directly discarded in a site for waste materials disposal because a suitable treatment method has not been found. However, recently, with a view to reducing and/or detoxifying waste materials and, additionally, effectively utilizing resources, reduction and/or detoxification of waste materials and, additionally, utilization of reclaimed resources, that is, recycling of resources, is noted and studied. The need for establishing a concrete and practical technique for reducing or detoxifying waste materials and, additionally, recycling of resources has been pointed out.

Given the above background, reclaiming and utilizing or solidifying and sealing waste materials, such as fly ash and slag resulting particularly from metal processing such as steel-making, has been studied in various ways. However, a satisfactory method has not yet been developed.

The present inventors, having keenly studied in various ways the method and apparatus, found that it was not always practically easy to obtain materials solidified with sulfur and, if necessary, molded, by melting sulfur at high temperature and mixing it with waste materials under high temperature. The present inventors also found that there were some problems in the conventional method regarding the quality of molded materials solidified with sulfur and operations to make the molded materials.

In particular, products that resulted from solidifying fly ash with sulfur were low in physical strength and sometimes caused cracks. Further, when slag and/or dust resulting particularly from metal processing such as steel-making were mixed with melted sulfur under high temperature for producing molded materials, in the presence of iron in the slag and/or dust, irritating sulfurous acid gas was often generated. This adversely affected the molding operation environment, making a deodorizing apparatus indispensable to prevent secondary pollution by the molding operation. In addition to the above, only molded materials that were unsatisfactory in physical strength were obtained, and sometimes the molded materials were cracked.

The following fourteen (14) patents were uncovered in the pertinent field of the present invention:

1. U.S. Pat. No. 3,720,609 issued to Smith et al. on Mar. 13, 1973 for "Process For Treating Aqueous Chemical Waste materials Sludges And Composition Produced Thereby" (hereafter "the '609 Smith Patent");
2. U.S. Pat. No. 3,962,080 issued to Dulin et al. on Jun. 8, 1976 for "Sodium Sulfur Oxides Waste Materials Disposal Process" (hereafter "the Dulin Patent");
3. U.S. Pat. No. 4,108,677 issued to Valiga on Aug. 22, 1978 for "Process For Treating Waste materials Sludge From Combustion Plant Desulfurization Units And Comentitious Product of The Process" (hereafter "the Valiga Patent");
4. U.S. Pat. No. 4,342,732 issued to Smith on Aug. 3, 1982 for "Sludge Fixation And Stabilization" (hereafter "the '732 Smith Patent");
5. U.S. Pat. No. 4,354,876 issued to Webster on Oct. 19, 1982 for "Utilization of Dry Scrubber Waste Materials" (hereafter "the Webster Patent");
6. U.S. Pat. No. 4,354,942 issued to Kaczur et al. on Oct. 19, 1982 for "Stabilization Of Mercury. In Mercury-Containing Materials" (hereafter "the Kaczur Patent");
7. U.S. Pat. No. 4,844,815 issued to Ader et al. on Jul. 4, 1989 for "Stabilization Of Mercury-Containing Waste materials" (hereafter "the Ader Patent");
8. U.S. Pat. No. 5,304,706 issued to Hooykaas on Apr. 19, 1994 for "Fixing Agent For Fixing Organic And Inorganic Impurities Containing Material, Method For Fixing Such Material And A Synthetic Clay Material" (hereafter "the Hooykaas Patent");
9. U.S. Pat. No. 5,362,319 issued to Johnson on Nov. 8, 1994 for "Process For Treating Fly Ash And Bottom Ash And The Resulting Product" (hereafter "the Johnson Patent");
10. Soviet Patent No. 761,437 (hereafter "the Soviet Patent");
11. JP-B-2-30751 ("JP-B" means examined Japanese patent publication);
12. East German Patent No. 288,099 (hereafter "the East German Patent");
13. JP-A-9-194737 ("JP-A" means unexamined published Japanese patent application); and
14. DE 37 07 257 A1.

The '609 Smith Patent discloses a process for treating aqueous chemical waste materials sludge and compositions produced thereby.

The Dulin Patent discloses a sodium sulfur oxide waste material disposal process.

The Valiga Patent discloses a process for treating waste materials sludge from combustion plant desulfurization units and cementitious product of the process.

The '732 Smith Patent discloses sludge fixation and stabilization.

The Webster Patent discloses the utilization of dry scrubber waste materials.

The Kaczur Patent discloses a stabilization of mercury in mercury-containing materials.

The Ader Patent discloses a stabilization of mercury-containing waste materials. It is a method which involves a chemical reaction in which sulfur is reacted with a base to form a sulfide which is then reacted with the mercury to form a new compound, insoluble mercury sulfide, which is then encapsulated (at a macro level) with cement created from cement dust and water.

The Hooykaas Patent discloses a fixing agent for fixing organic and inorganic impurity containing material, method for fixing such material and a synthetic clay material.

The Johnson Patent discloses a process for treating fly ash and bottom ash and the resulting product.

The Soviet Patent discloses a complex concrete mix modifier composition containing acid vat residue of raw benzene fractionation, sodium carbonate and sulphite waste materials liquor to improve plasticity.

JP-B-2-30751 discloses a process for solidifying industrial waste material, which comprises coating industrial waste materials containing sulphates with synthetic or natural resins, and then solidifying the resultant coated matter by cement.

The East German Patent discloses a process and arrangement for conversion of sulphur waste materials into disposable products. It extracts sulphur from combustion gases into a scraper belt trough and mixes with rust ash.

JP-A-9-194737 discloses a sulfur-asphalt composition being low in ignitability, high in compression strength, resistant to granulation, and stable in solid state.

DE 37 07 257 A1 discloses a method for direct embedding of solidified, especially toxic and/or radioactive materials, especially waste, existing in a loose state, in a storage container. In DE 37 07 257 A1, sulfur is used in specific conditions, that is, in the presence of NaCl, KCl in high amounts, e.g. 40 to 50 wt %.

In the above patents, there are no disclosure or teaching of the solidification and sealing of a toxic substance in a high concentration.

It is highly desirable to provide an efficient process which utilizes elemental sulfur, sulfur-based materials, sulfur-based compounds or sulfur-based substances for the safe disposal of matter, including but not limited to, all toxic substances and other hazardous substances (solids and liquids) into a form that renders the matter non-toxic and additionally reusable.

On the other hand, among toxic substances, although PCBs (polychlorinated biphenyls) were used as a heating medium, an oil for transformers, etc., their use is now prohibited, except in some fields, since they remain in the environment for a long time and are highly toxic to the human body. Environmental pollution from the outflow of PCBs or the like from waste PCBs that have been used and stored, remains, however, a serious social problem.

To detoxify PCBS, the complete combustion method, the hydrothermal decomposition method (supercritical method); the dechlorination method, wherein light or radiation is used, and the like can be mentioned, and the final disposal place for waste PCBs, their incineration ash, etc., is required to be provided with a water barrier structure or the like. Other toxic substances besides PCBs, such as organochlorine compounds other than PCBs, are also required to be detoxified in the similar manner or processed in a final disposal place. However, since all of these means requires high-cost facilities, it is pointed out that a technique of detoxifying these toxic substances readily at a low cost needs to be established.

Under these circumstances, various investigations have been made to solidify and seal toxic substances, including organochlorine compounds, such as PCBs. However, a method has not yet been developed that is satisfactory in that toxic compounds can be prevented from leaching out, and, in addition, in that the reclaimed product can be utilized effectively, for example, a method has not yet been developed where the reclaimed product attains physical properties that allow it to be used, for example, as a building or construction material.

SUMMARY OF THE INVENTION

It is an object of the present invention to provide a process wherein sulfur is used for the disposal of matter, including but not limited to all toxic substances (including inorganic and organic toxic substances) and other hazardous substances, each of which have a boiling point higher than the temperature necessary to melt sulfur (solids and liquids) into a form that renders the matter non-toxic and additionally reusable as a base material in granular or various molded forms. The sulfur can be elemental sulfur, sulfur-based materials, sulfur-based compounds and sulfur-based substances.

It is another object of the present invention to provide a method for solidifying toxic substances including, but not limited to, organochlorine compounds, such as PCBs, and heavy metals, and other hazardous substances with sulfur, to prevent the toxic substances from leaching out.

It is still another object of the present invention to provide a method wherein a material solidified with sulfur, whose performance, such as physical strength, and quality are high and constant, and from which toxic substances do not leach out, and, in addition, which may or may not be molded or reused, can be industrially produced.

It is still further object of the present invention to provide a method wherein material such as slag and/or dust resulting particularly from metal processing such as steel-making, or the like, is mixed with a molten state sulfur and is solidified thereby. This method enables solicification and, if necessary, the production of molded materials.

It is still another object of the present invention to provide a method of manufacturing materials solidified with sulfur and, if necessary, molded, in which the performance, such as physical strength, and quality are high and constant, and in which toxic substances such as harmful heavy metals, PCBs, DDT, dioxins or the like will not leach out of the materials.

It is still another object of the present invention to provide a method for producing molded materials solidified with sulfur, which method can prevent the molding operation environment from being adversely affected by the generation of sulfurous acid gas, in spite of using melted sulfur with materials such as slag and/or dust resulting particularly from metal processing such as steel-making under high temperature.

It is still another object of the present invention to provide a method wherein materials such as slag and/or dust resulting particularly from metal processing such as steel making, can be cooled in either water, open air or other suitable means to form a granular form that can be used as is, or later melted and molded into various forms, for various applications.

One of the novel and unique characteristics of the present invention is the discovery of liquid sulfur has the unique property of penetrating and encapsulating all substances that are soluble in sulfur at the molecular level, and the utilization of this discovery in the treatment of organic and inorganic toxic substances by using liquid sulfur to penetrate and encapsulate the solid or liquid toxic substances at the molecular level.

Other and further objects, features, and advantages of the invention will appear more fully from the following description, taken in connection with the accompanying drawings.

DETAILED DESCRIPTION OF THE INVENTION

Figure 1:
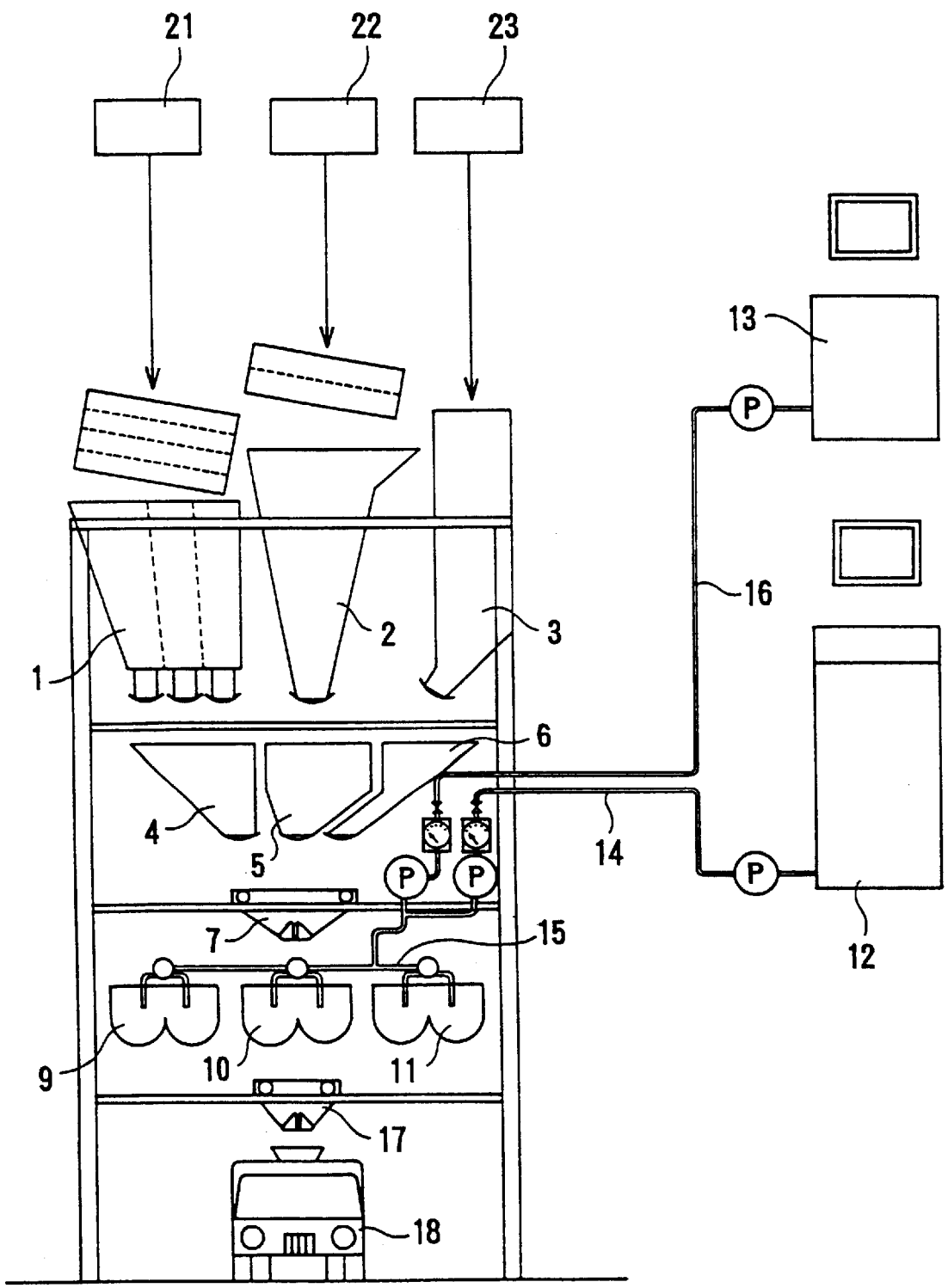
FIG. 1 is a view illustrating an embodiment of an apparatus for solidifying and sealing a toxic substance with sulfur, which apparatus is preferable in carrying out the method of the present invention.

Although specific embodiments of the present invention will now be described with reference to the drawings, it should be understood that such embodiments are by way of example only and merely illustrative of some of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

As the first embodiment, the present invention provides:

(1) A method for solidifying and sealing in a toxic substance with sulfur, comprising (A) heating and mixing a raw material mixture containing a substance to be treated and sulfur, at a temperature in the range of 119 to 159° C., to prepare a fluid mixed mixture under sulfur being melted, wherein the substance to be treated has a boiling point of over 119° C. and has the solubility characteristics in a low-polar solvent, the low-polar solvent being eluted earlier than t-butanol when eluted from a silica gel column, and wherein the temperature is lower than the boiling point of the substance to be treated; and then (B) cooling the mixture, thereby solidifying and sealing in the substance to be treated, and if necessary, molding the mixture into a prescribed shape;

(2) The method as stated in the above (1), wherein slag resulting particularly from metal processing such as steel-making and/or dust resulting particularly from metal processing such as steel-making is heated and mixed together with the substance to be treated and sulfur; and (3) The method as stated in the above (1), wherein the raw material mixture contains an organochlorine compound and sulfur.

Preferable modes of the present invention can be mentioned:

(4) The method as stated in the above (1), wherein the water content of the substance to be treated is brought to less than 3% by weight, and the substance to be treated is heated and mixed together with sulfur; and (5) The method as stated in the above (2), wherein the water content of each of the slag resulting particularly from metal processing such as steel-making and/or the dust resulting particularly from metal processing such as steel-making is brought to less than 3% by weight, and the slag resulting particularly from metal processing such as steel-making and/or the dust resulting particularly from metal processing such as steel-making are heated and mixed together with sulfur and the substance to be treated whose water content is brought to less than 3% by weight.

According to the above first embodiment of the present invention, toxic organochlorine compounds, such as PCBS, can be solidified and sealed in with sulfur positively and quite effectively. Particularly, when slag and/or dust resulting particularly from metal processing such as steel-making is additionally used, a product solidified with sulfur that is quite high in specific gravity and strength, and additionally that may be useful as a ballasting material, can be obtained.

Thus, according to the first embodiment of the present invention, a new material can be obtained by solidifying and sealing in substances such as organochlorine compounds that cannot be solidified effectively by conventional means. Therefore, the significance is quite remarkable in the present invention in view of the prevention of environmental pollution and, in addition, the reclamation and utilization of resources.

Further, the inventors of the present invention found that, in addition to the harmful heavy metal species, substances having a boiling point higher than the temperature necessary to melt sulfur, can be solidified and sealed in with sulfur, according to the method of the present invention. Accordingly, as the second embodiment, the present invention provides a method for manufacturing materials solidified with sulfur, and a system of sealing in all toxic substances which have a boiling point higher than the temperature necessary to melt sulfur such as harmful heavy metal species, PCBs, DDT, dioxins, comprising the steps of bringing the water content of a raw material to be mixed with sulfur, such as slag and/or dust resulting particularly from metal processing such as steel-making, to less than 3% by weight, heating and mixing the mixture of raw materials including molten sulfur at a temperature in the range of from 119 to 159° C., to cause the melted sulfur to penetrate and encapsulate the raw material that is solid or liquid at the molecular level, thereby preparing a fluid mixed mixture, and then cooling the mixture. If necessary, the resultant cooled material solidified with sulfur can be molded into a desired shape during the cooling step, or it can be molded into a desired shape, or cooled into a granular form which can, if necessary, be remelted and molded into a desired shape.

Further, as the third embodiment, the present invention provides a method for manufacturing materials solidified with sulfur, and a system of sealing in harmful heavy metal species, comprising the steps of bringing the water content of a raw material to be mixed with sulfur, such as slag and/or dust resulting particularly from metal processing such as steel-making, to less than 3% by weight, heating and mixing the mixture of raw materials including molten sulfur at a temperature in the range of from 119 to 159° C., to cause the melted sulfur to penetrate and encapsulate the raw material that is solid or liquid at the molecular level, thereby preparing a fluid mixed mixture, and then cooling the mixture. If necessary, the resultant cooled material solidified with sulfur can be molded into a desired shape during the cooling step, or it can be molded into a desired shape, or cooled into a granular form which can, if necessary, be remelted and molded into a desired shape.

In particular, according to the second embodiment of the present invention, from waste materials containing all toxic substances which have a boiling point higher than the temperature necessary to melt sulfur such as harmful heavy metal species, PCBs, DDT, dioxins, a material solidified with sulfur from which the leaching out of the toxic substances such as harmful heavy metal species, PCBS, DDT, dioxins, is completely prevented, can be obtained. Additionally, the materials solidified with sulfur having a high specific gravity and high physical strength can be useful as ballasting materials. The materials solidified with sulfur can be used as a material to produce molded articles further processed.

According to the third embodiment of the present invention, a solid material, such as slag and/or dust resulting particularly from metal processing such as steel-making, and dust from incinerated waste materials, can be solidified and sealed in with sulfur quite effectively and positively, at the same time, by suppressing the occurrence of sulfurous acid gas during heating to melt. In addition, a material solidified by sulfur that is high in physical strength can be obtained.

An apparatus for manufacturing materials solidified with sulfur, which apparatus can be preferably used for carrying out the present invention, comprises a means for heating and drying a raw material to be mixed with sulfur, such as slag and/or dust resulting particularly from metal processing such as steel-making, a means for heating and mixing the mixture of raw materials including molten sulfur, and, if necessary, a means for molding a mixture of the solid material and the molten sulfur into a desired shape or cooling it into a granular form. The apparatus for manufacturing materials solidified with sulfur, which apparatus can be used in the present invention, is effective to produce a molded item solidified with sulfur in a continuous manner.

Hereinbelow the present invention will be described in detail. Herein, "the present invention" denotes all of the above first, second, and third embodiments, unless otherwise specified.

The method of the first embodiment of the present invention is described first.

According to the first embodiment of the present invention, a compound (a substance to be treated) that is slightly soluble in water, has solubility characteristics (solution-forming properties, solvability) in a low-polar solvent that has solubility characteristics in sulfur, and does not volatilize/spatter by heating and mixing with liquid sulfur, can be solidified and sealed in with sulfur.

In the first embodiment of the present invention, the term "low-polar solvent" means a solvent that is eluted earlier than t-butanol when said solvent and t-butanol are eluted from a silica gel column. Examples of the low-polar solvents include, but are not limited to, for example, heptane, hexane, pentane, cyclohexane, trimethylpentane, carbon disulfide, carbon tetrachloride, trichloroethylene, xylene, toluene, benzene, chloroform, dichloromethane, and diisopropyl ether, which are enumerated in the order of elution, with the first eluted earliest. Whether or not a certain solvent is eluted earlier than t-butanol can be known by comparing the elution time of the particular solvent with the elution time of t-butanol under the same conditions by using silica gel column chromatography (elution analysis) employing, for example, silica gel as an adsorbent. In order to compare the elution times of the particular solvent or t-butanol, the particular solvent and t-butanol may be added to a silica gel column simultaneously. Alternatively, elution analysis of the particular solvent or t-butanol may be carried out separately to compare the resulting elution times of these two. In the above elution of the particular solvent and t-butanol, another third solvent or some other solvents may be used to control the elution rate.

In the first embodiment of the present invention, the substance to be treated may be heated and mixed with sulfur in the presence of a solvent, where the solvent is preferably a low-polar solvent. For example, the substance to be treated can be brought to a solution in the solvent and then the resulting solution and sulfur are mixed, or the solvent can be added to sulfur before or during the addition of the substance to be treated. The amount of the solvent to be used is not particularly restricted, and it is preferably 0.01 to 100 weight parts, more preferably 0.1 to 10 weight parts, to 100 weight parts of sulfur. Alternatively, such a solvent can be omitted in carrying out the method of the present invention, i.e. heating and mixing of the raw material mixture can be carried out without the (low-polar) solvent.

By the term "a substance to be. treated that has solubility characteristics in a low-polar solvent, which solvent is eluted earlier than t-butanol when eluted from a silica gel column" is meant a substance that is so-called soluble in the solvent. Herein, the term "being soluble" means that the solubility is generally 1,000 mg/l or more (at 25° C.), preferably 2,000 mg/l or more (at 25° C.). In order not to allow the substance to be treated to volatilize/spatter when heated together with liquid sulfur, the boiling point of the substance must be higher than at least 119° C., and preferably it is higher than 159° C. Herein, the term "a silica gel column" means a column filled with a silica gel that is used for a column chromatography or a thin-layer chromatography. As the silica gel, commercially available one such as Silica Gel 60 and Silica Gel 60G (trade names) can be used. Alternatively, an alumina gel column can be used instead of the silica gel column, when the solvent is more soluble in water.

In the first embodiment of the present invention, preferably the substance to be treated is one that is readily soluble in sulfur; that is, it has a high solubility in the solvent that has a higher solubility in sulfur when the solvent is dissolved in sulfur. Generally, the solvent that is eluted much earlier when eluted from a silica gel column is high in solubility in sulfur. More preferably, in the first embodiment, the substance to be treated is a compound having the forgoing solubility characteristics in one solvent selected from among heptane, hexane, pentane, cyclohexane, trimethylpentane, carbon disulfide, and carbon tetrachloride. Particularly preferably the substance to be treated is a compound that has the foregoing solubility characteristics in hexane. Preferably, the substance to be treated is not soluble in t-butanol. Herein, the term "not soluble in t-butanol" means that the substance does not have the foregoing solubility characteristics in t-butanol. Preferably, the substance to be treated is slightly soluble in water. Herein, the term "slightly soluble" means that the solubility in water is generally 100 mg/l or less (at 25° C.).

t-Butanol can be mixed with water in arbitrarily-chosen proportions. On the other hand, the solvent (such as hexane and the like) that is eluted earlier than t-butanol in the elution analysis from a silica gel column, is a solvent that is hydrophobic; is not miscible with water and therefore forms separate layers with it; has a low polarity; and is able to dissolve sulfur. Therefore, the first embodiment of the present invention is characterized in that a compound (a substance to be treated) that is dissolved in sulfur can be solidified and sealed in with sulfur, utilizing the fact that if the compound has solubility characteristics in such a solvent low in polarity, the compound itself results in having solubility characteristics in sulfur according to the mutual solubility characteristics among the compound, the solvent, and sulfur.

In the first embodiment of the present invention, a raw material mixture containing the substance to be treated and sulfur are heated and mixed. Herein the substance to be treated may be a simple substance of itself, a mixture of two or more of the substances, or a mixture of the substance to be treated with another substance, in which the form of the substance may be either a liquid or a solid. Examples of a raw material containing such a substance to be treated include, for example, incineration ash, soot and dust, fly ash, waste PCBs from transformer oil, organochlorine compound-type insecticides, and extracts of their residue extracted from water or soil (polluted soil). Out of the solid raw materials, incineration ash generally does not contain water, but sometimes it contains water in an amount of about 5 to about 3% by weight, depending on its storage state.

In the first embodiment of the present invention, as a measure of the water-insolubility of the compound; in other words, as a measure of the affinity between the substance to be treated and sulfur, the solubility characteristics in the low-polar solvent that is eluted earlier than t-butanol from a silica gel column is used. In addition to the substance's satisfying the solubility characteristics, preferably the solvent strength parameter ($\epsilon^0$) of the solvent in which the substance to be treated will be dissolved is in a prescribed range. Herein the term "solvent strength parameter ($\epsilon^0$)" means the solvent strength when alumina is used as an adsorbent, and the solvent strength parameter has the relationship: $\epsilon^0(silica) \approx 0.77 \times \epsilon^0(alumina)$ [L. R. Snyder, *Advances in Analytical Chemistry & Instrumentation*, edited by C. R. Reilly, Wiley (1964)]. In the first embodiment, preferably the substance to be treated is a compound having the foregoing solubility characteristics in a solvent that has a solvent strength parameter ($\epsilon^0$) of 0.5 or less (e.g. heptane (0.01, $\epsilon^0$ value, hereinafter the same being applied), hexane (0.01), cyclohexane (0.04), trimethylpentane (0.01), carbon disulfide (0.15), carbon tetrachloride (0.18), toluene (0.29), benzene (0.32), chloroform (0.40), dichloromethane (0.42), and diisopropyl ether (0.28)). The solvent strength parameter ($\epsilon^0$) is more preferably 0.2 or less, and particularly preferably 0.05 or less. In the first embodiment, that the solvent strength parameter ($\epsilon^0$) of a compound is 0.5 or less can be confirmed by the particular compound's having the above prescribed solubility characteristics in an organic solvent whose solvent strength parameter ($\epsilon^0$) is known to be 0.5 or less. This is based on the assumption that, when a compound is dissolved in a solvent, the compound has a solvent strength parameter at least equivalent to that of the solvent. Thus, in the first embodiment, that the solvent strength parameter ($\epsilon^0$) is to be a prescribed value does not necessarily mean that the value of the solvent strength parameter ($\epsilon^0$) of the compound is known; rather it means that the solvent strength parameter ($\epsilon^0$) measured by a conventional method or confirmed by the above method satisfies the prescribed conditions.

Further, in addition to the substance to be treated, to be solidified and sealed in with sulfur, having a prescribed solubility characteristics in the solvent that is eluted earlier than t-butanol, preferably the substance to be treated has a dielectric constant (H. Wollmann et al., *Pharmazie*, 29, 708 (1974)) of 10 or less, and/or its dipole moment (calculated in accordance with the Debye's formula and measured in benzene) is 1.5 or less. More preferably the dielectric constant is 5 or less, and particularly preferably 3 or less. Further, more preferably the dipole moment is 1.3 or less, and particularly preferably 0.

Examples of the substance to be treated that is the object to be solidified with sulfur in the method of the first embodiment include, for example, but are not limited to, organochlorine compounds, such as polychlorinated biphenyls (PCBs), polychlorinated terphenyls (PCTs), polychlorinated quaterphenyls (PCQs), and dioxins including polychlorinated dibenzofurans (PCDFs) and polychlorinated dibenzoparadioxins (PCDDS) (e.g. dioxin), as well as p,p'-dichlorodiphenyltrichloroethane (DDT), p,p'-dichlorodiphenyldichloroethane (DDD), dieldrin, hexachlorocyclohexanes (HCHS) (benzenehexachlorides (BHCs)). As substances to be treated other than the above, for example, organophosphorus compounds, such as parathion, methyl parathion, EPN (O-ethyl O-p-nitrophenyl phenylphosphonothioate), and methyl demeton can be mentioned.

In the method of the first embodiment, not only the toxic substance to be treated itself but also other toxic substances that are contained in the raw material containing the substance to be treated, can be solidified and sealed in satisfactorily with sulfur. Further, when an aggregate is used together with the above substance to be treated and sulfur, the resulting solidified product can be provided with further high physical strength. There are no particular restrictions on the aggregate, and as the aggregate, for example, slag, dust, and fine stone can be used, with preference given to slag resulting particularly from metal processing such as steel-making and/or dust resulting particularly from metal processing such as steel-making. These materials such as slag and dust resulting particularly from metal processing such as steel-making are high in iron content and hence a high specific gravity, and therefore by using them, the resulting solidified product can advantageously have a high specific gravity and excellent physical strength.

In the first embodiment of the present invention, the slag and dust resulting particularly from metal processing such as steel-making used as aggregates can also be solidified and sealed in with sulfur, although such slag and dust or substances other than the substance to be treated do not have the above specific solubility characteristics in the low-polar solvent or sulfur. Namely, although slag and dust resulting particularly from metal processing such as steel-making contain, generally, in addition to iron, toxic heavy metals, such as Pb and As, these heavy metal species are also sealed in with liquid sulfur, and after the solidification and, if necessary, molding, the heavy metal species do not leach out from the solidified product.

In addition, in the method of the present invention, polluted soil, industrial waste, etc., and preferably, those that have been dried and/or incinerated to bring the water content to less than 3% by weight, can be used.

Sulfur in the liquefied state behaves like usual organic solvents. The temperature range in which sulfur is in the liquefied state is 119 to 159° C., and sulfur turns to yellow fluid λ sulfur or brown viscous μ sulfur, depending on the temperature. Sulfur is essentially of a colloid dispersion system, and it is known that sulfur is completely soluble in hexane and shows solubility characteristics in heptane, pentane, cyclohexane, carbon disulfide, etc. Further, the Clarke number of sulfur is 0.052 (the fifteenth in order of quantity from the largest), and the ratio of sulfur present on the earth is large.

When sulfur is in the liquid state, the liquid sulfur can dissolve substances having low polarities, since the polarity of liquid sulfur itself is low. Further, when there are an organic solvent capable of dissolving sulfur, and a compound capable of being dissolved in that organic solvent, sulfur also can be dissolved in the organic solvent with the compound dissolved in the organic solvent. Such a compound is low in polarity, like the above organic solvent, and insoluble in water, and the compound can be dissolved in sulfur even without the organic solvent, since the compound has mutual solubility characteristics with sulfur. Utilizing this property, PCBs, whose outflow and pollution are a social problem, can be heated and mixed together with sulfur to form a uniform mixture. Then, by cooling the mixture to normal temperatures to solidify the sulfur, the PCBs taken into the mixture-can be solidified and sealed in with sulfur. Further, surprisingly, the inventors of the present invention have found that, even when the thus-obtained solidified product is ground into a powder having a greater surface area, and the powder is dispersed into water and subjected to a leaching-out test, the PCBs taken into the solidified product do not leach out into water. Further, according to the method of the present invention, it seems that various other compounds having similar structure and physical properties as those of PCBs, such as organochlorine compounds including PCDFs, PCDDs (e.g. dioxin), and DDT, as well as other substances, can be solidified and sealed in.

The present invention (all of the above first, second and third embodiments) will be described based on the detailed embodiments shown in the respective figures.

Referring to FIG. 1, it shows a view illustrating an embodiment of the apparatus for solidifying and sealing in a toxic substance with sulfur, according to the present invention.

In FIG. 1, 1 indicates a hopper for a material such as slag resulting particularly from metal processing such as steel-making; 2 indicates a hopper for a material such as incineration ash (this is the substance to be treated or a raw material containing it in the first embodiment); 3 indicates a hopper for a material such as dust resulting particularly from metal processing such as steel-making; and 4, 5, and 6 indicate metering tanks for the materials or aggregates (i.e., slag resulting particularly from metal processing such as steel-making, incineration ash, and dust resulting particularly from metal processing such as steel-making, respectively) from the respective hoppers 1, 2, and 3. In the metering tanks, the materials or aggregates are metered, and the metered materials are fed to the feeder 7 (e.g. a movable metering feeder).

Further, 21, 22, and 23 indicate heating and drying apparatuses for the materials and aggregates other than sulfur, which apparatuses are provided with burners or the like, using fuel such as heavy oil. The heating and drying apparatuses are of the type such as rotary kilns. In the heating and drying apparatuses, the materials and aggregates other than sulfur are heated to temperatures of the order of 120 to 200° C., and their water contents are brought to generally less than 3% by weight, preferably less than 1.5% by weight, and more preferably less than 1% by weight.

In the Figures, additionally, 9, 10, and 11 indicate mixers, into which the material mixture, in a prescribed amount, is fed from the feeder 7; 12 indicates a tank for sulfur as another material that will be charged into the feeder 7; and 13 indicates a tank for an additive. Sulfur is heated in the tank 12 to a prescribed temperature, and prescribed amounts of the sulfur are fed into the mixers 9, 10, and 11, through pipes 14 and 15. The tank 12 may be provided with an apparatus for deodorizing, if necessary. Further, an additive is appropriately fed through pipes 16 and 15. Herein, the additive can be one that serves to delay the solidification of sulfur.

After the mixture from the feeder 7, and the sulfur and the additive through the pipe 15 are charged into the mixers 9, 10, and 11, they are mixed (kneaded).

In reference to the mixers 9, 10, and 11, to select a type of mixer, it is suitable to select a mixer by placing importance on a time that allows the molten sulfur to penetrate adequately into aggregates (slag, dust, etc., they act as if aggregates in concrete). Any type of mixer can be used, such as a single-screw mixer, a double-screw mixer, a batch-type mixer, and a continuous-type mixer, and generally is used a double-screw pug mill-type circulation mixer of a batch type, wherein tracks of paddle tips are overlapped to carry out uniform mixing. In the mixers used in the present invention, it is required to adopt a system that allows molten sulfur to penetrate into aggregates satisfactorily by taking as much time as is necessary.

However, in the case of the sulfur mixture in this invention, sulfur in the mixed mixture is oxidized little, and mixing for a period as long as several minutes to several tens of minutes allows a compound and an atom to be solidified and sealed in sulfur in the molecular or atomic state. Further, it allows sulfur to penetrate into pore spaces on the aggregate, thereby enabling a good-quality sulfur mixture to be produced.

Furthermore, if the mixer for the sulfur mixture is provided with a speed-variable apparatus, such as an inventor, so that various types of aggregates may be mixed, a good-quality sulfur mixture can be produced with reduced wear of the mixer, reduced power consumption, and at low cost.

More importantly, the materials in the mixer during the mixing must be kept generally at about 95 to about 150° C., and at not more than about 160° C., and preferably at 115 to 140° C. Accordingly, it is preferable to jacket the outer circumference of the mixer an insulating material and to heat the mixer wall by a heat source, such as an electric heater, a heating medium oil, or steam. Further, since it is needed to suck out dust and toxic substances such as harmful gases that are generated in the mixer during the mixing when a toxic waste material is treated, sometimes the inside of the mixer is heated in order to prevent lowering of the temperature due to the suction.

It is suitable for the apparatus and the system of the present invention that the order of the feeding of the materials into the mixers can be arbitrarily changed. Thereby, a change in the type of material and a change in formulation can easily be coped with. Depending on the type of material and the formulation, in some cases, sulfur penetrates into the aggregate in a large amount during the mixing. In such a case, if the required sulfur is fed into the mixer all at once, since the state in the mixer becomes water-like and the mixture is apt to leak, for example, from the sealed sections of the shaft and the discharge gate, or the mixture is sometimes splashed up by the mixing blades in the mixer, the sulfur is preferably fed into the mixer in plural portions divided.

Since, in the sulfur mixture, use may be made of a material that facilitates abrasion, such as slag of iron and steel, preferably the mixing blades and the case liner of the mixer should be made of an abrasion-resistant cast iron, a ceramic, etc.

In the present invention, the mixer is preferably of a batch type. A batch-type mixer gives the advantage that dehydrated and heated materials held in the insulated hoppers can be charged into the mixers, with changing the order of the charging in accordance with the purpose.

Various orders of charging can be selected; for example, (1) a method wherein dust having fine-particles's particle diameters, the substance to be treated such as waste materials (e.g. incineration ash), and sulfur are mixed, and thereafter coarse particles of slag and some other waste materials are charged, followed by mixing; (2) a method wherein fine particles of dust, coarse particles of slag, and the substance to be treated are mixed and sulfur is charged into the mixture, followed by mixing, to complete the mixing; and (3) a method wherein the substance to be treated, course particles, fine particles, and sulfur are charged all at once, and mixing is then completed. Herein, the substance to be treated may be a toxic or hazardous substance, and may be omitted in the above methods depending on the purpose, i.e. depending on the subjects to be solidified and sealed in with sulfur.

The penetration of liquid sulfur into pore spaces on the solid materials can be carried out by adjusting the temperature condition, stirring speed, and residence time during mixing.

In the mixer used in the present invention, it is required that liquid sulfur diffuses, with the sulfur having affinity for all the surface layers of dehydrated and dried solids (preferably water content of less than 3% by weight). Therefore, it is important for the mixing time and the temperature of the material to be kept within certain ranges. That is, since the physical properties of liquid sulfur are 11 cp and 7 cp at 119 to 159° C., this temperature range must be kept. At 159° C. or over, the viscosity increases sharply, and at 187° C. it is $10^5$ cp, at which the sulfur is nearly an elastomeric material. At 119° C. it becomes a solid of a monoclinic system, and at 112° C. it becomes a solid of a rhombic system. At normal temperatures, it becomes an $S\alpha$:$S_8$ cyclic solid (of a rhombic system), which is most stable, and when Sliq→$S\alpha$, due to the affinity with heavy metals, such as Fe and Mn, their coexistence is bound to influence the stability and contraction property of $S\alpha$. With respect to the mixing time, if the mixing time is too short, the resulting solidification and sealing in may become insufficient sometimes causing the detectable leaching out of heavy metals, e.g. Pb and Cd. The mixing time is preferably more than 10 min, more preferably more than 15 min, and further preferably 20 min or more. In the present invention, it is important not merely to embed the raw materials but to uniformly mix (knead) them with sulfur, to attain a complete sealing in of a toxic substance. With respect to the mixing pressure, it is preferable to carry out the mixing in the present invention under normal pressure or under pressure (including a mechanical partial pressure in the apparatus). According to the present invention, not only sulfur but also organic compounds sealed in cannot be extracted with a solvent from the material solidified with sulfur. Contrary to the above, in a conventional method, the material or waste can be recovered from the embedded and consolidated product by dissolving the sulfur with a solvent (e.g. $CS_2$, $S_2Cl_2$).

In FIG. 1, 17 indicates a movable meter, and indicates a cooker vehicle. The fluid mixed mixtures prepared in the mixers 9, 10, and 11 are transferred from the mixers, through the movable hopper 17 for sulfur-solidified material, to the cooker vehicle 18. In some cases, if necessary, the fluid mixture is discharged, to be poured into a mold to be molded into a shape of a cylinder or a panel, for example, to form a stake or a pile, in which shape, if necessary, reinforcement steel can be placed in the molded material. In other cases, the fluid mixed mixture is discharged, to be molded and solidified into a desired shape. Alternatively, in order to obtain a material in a crushed or granular form to meet the purpose of application of the sulfur-solidified material, an apparatus may be chosen in which a motor-driven sieve is placed downstream of the path of the flow of the fluid mixture (at 140 to 120° C.), to form particles with sizes in conformity with the openings of the sieve, and the particles are plunged into water to be solidified (water-granulated). A movable heat-resistant belt conveyor may also be placed below the sieve, to allow particles with desired sizes to be grouped, gradually cooled, and solidified, thereby producing gradually cooled and granular formed materials solidified with sulfur.

The case wherein the molding and cooling of the fluid mixture are carried out by water granulation or gradual cooling is now described further. According to water granulation, the fluid mixture having a high temperature (140 to 120° C.) is abruptly cooled with water. This yields a water-granulated sulfur-solidified material which can be crushed, and a sulfur-solidified material, most of whose masses have sides 50 mm or below in size, can be obtained. The water-granulated sulfur-solidified material is small in particle diameter and can be crushed further to about sizes of sand grains, and the shapes of the obtained granules are not uniform and resemble the shapes of crushed coke.

The physical strength of the masses of the sulfur-solidified material obtained by water granulation is low, and therefore the masses can be crushed easily to smaller sizes, to be used as a fine aggregate (sand-like particles: 5 to 0.3 mm). Since the water-granulated sulfur-solidified material is not uniform in particle diameter, and the outer surface of the granules is rugged, if the water-granulated sulfur-solidified material is added to sand or gravel, the resulting mixture can be very easily made compact and is preferable, for example, as a high-load-bearing earth filling material for beaches.

On the other hand, according to gradual cooling, the solidified material after the cooling becomes single mass, which is high in specific gravity and high in physical strength. When the mass is crushed and the sizes of the particles are chosen, a coarse aggregate (40 to 5 mm) can be obtained. Since the gradually cooled sulfur-solidified material is high in physical strength and large in specific gravity, it can be used, for example, as a filler in concrete caissons.

Further, when the sulfur-solidified material resulting from water-granulation or gradual-cooling as it is, or the granularly-formed or finely-crushed solidified material, is heated to from 120° C. to 140° C. (but not higher), it can be easily remelted and fluidized. The remelted sulfur-solidified material can be easily molded into a desired shape or cooled into a granular form; for example, into a plate or a cylinder, such as a stake or a pile, by pouring it into a mold of desired shape. In this case, if the molded product is a large-sized product small in surface area that is, for example, one obtained by gradual-cooling, since the heat conductivity is small, it is resistant to being remelted. Therefore, it is sometimes necessary to be made into a finely crushed form as described above.

In the present invention, examples of materials that can be incorporated into the sulfur-solidified material include, for example, slag resulting particularly from metal processing such as steel-making, dust resulting particularly from metal processing such as steel-making, and waste materials containing all inorganic or organic toxic substances which have a boiling point higher than the temperature necessary to melt sulfur (e.g. harmful substances, heavy metals, PCBs, DDT, dioxins), and particulars thereof and compositions when they are processed are described, for example, in JP-B (JP-B means examined Japanese patent publication) Nos. 51440/1987, 15759/1986, 15274/1987, and 49680/1990.

There are no particular restrictions on the composition and the type (the origin) of slag resulting particularly from metal processing such as steel-making and dust resulting particularly from metal processing such as steel-making for use in the present invention other than the matter above described. If the composition or the like of these materials is varied a little, stable solidification and sealing in can be effected according to the present invention.

Slag resulting particularly from metal processing such as steel-making may be open-hearth furnace slag or convertor slag produced in the process of making steel by an open-hearth furnace or a convertor. Generally, slag resulting particularly from metal processing such as steel-making, for example, has the water content of 4 to 5% by weight.

Dust resulting particularly from metal processing such as steel-making may be a powder material that is collected in a dust collector in the process of making steel, for example, in a open-hearth furnace plant or a convertor plant. Although the major component of dust resulting particularly from metal processing such as steel-making varies depending on the formation conditions, it is mostly iron oxide, and the dust contains toxic materials, such as Cr, Cu, As, Pb, and Zn. Generally, dust resulting particularly from metal processing such as steel-making, for example, has the water content of 4 to 10% by weight.

Examples of the compositions of slag resulting particularly from metal processing such as steel-making and dust resulting particularly from metal processing such as steel-making that can be used in the present invention are shown in Tables 1 and 2, wherein "T-Fe" represents the total iron content of iron-containing components, such as Fe, $Fe_2O_3$, FeO and FeS, and the T-Fe is represented in terms of $Fe_2O_3$, and "M-Fe" means a content of metal iron.

TABLE 1

Slag Resulting Particularly From Metal Processing Such As Steel-Making

|   | T-Fe | FeO | SiO$_2$ | CaO | M-Fe |
|---|------|-----|---------|-----|------|
| A. | 16.4% | — | 13.0% | 44.0% | 2.4% |
| B. | 58.8% | 12.4% | 5.6% | 24.3% | — |
| C. | 24.6% | — | 12.8% | 31.0% | — |

TABLE 2

Dust Resulting Particularly From Metal Processing Such As Steel-Making

|   | T-Fe | FeO | SiO$_2$ | CaO | M-Fe |
|---|------|-----|---------|-----|------|
| A. | 68.5% | 69.5% | 0.9% | 2.9% | 12.0% |
| B. | 59.8% | 14.8% | 4.5% | 3.8% | — |
| C. | 61.9–63.4% | 3.0–4.8% | 1.2–2.0% | 2.3–3.8% | — |

Additional examples of waste materials containing hazardous- or toxic-substances, which can be used in the present invention, include, but are not limited to, waste materials containing toxic substances; soil contaminated with PCBs, DDT, dioxins, heavy metals or other toxic substances; dust (collected dust) released from metal-melting, refineries, and the like; dust (sludge) resulting from the treatment of waste water; dust or bottom ash resulting from incinerating residential or commercial garbage; ground materials of defective electric apparatuses and appliances resulting from the production of electric apparatuses and appliances; ground materials of waste electric apparatuses and appliances (e.g. fluorescent lamps and batteries) retrieved from the market; and many other types of waste matter and toxic substances. These can be used with other raw materials such as the substance to be treated and dust and/or slag resulting particularly from metal processing such as steel-making, unless the objects of the invention being affected. Further, the amount of these to be used may be generally 5 to 95% by weight, preferably 5 to 10% by weight, in the total solid materials including other raw materials such as the substance to be treated and dust and/or slag resulting particularly from metal processing such as steel-making.

Examples of the wastes are shown in the following table in detail, the table also showing the species and amounts of toxic substances contained in the wastes.

TABLE (Unit: mg/kg)

| Toxic substances | Waste[1] | | | | | Remarks: test method[2] |
|---|---|---|---|---|---|---|
| | Sludge (A) | Sludge (B) | Sludge (C) | Soot and dust | Waste electric apparatuses, appliances | |
| Alkyl mercuries | 0.0025 or less | 0.0025 or less | 0.0059 or less | 0.005 or less | 0.0097 or less | Notice No. 64; Attached Table No. 3 |
| Total mercury | 0.062 or less | 0.80 or less | 1.40 or less | 4.35 or less | 47.00 or less | Notice No. 64; Attached Table No. 2 |
| Cadmium or its compounds | 350 or less | 510 or less | 6.50 or less | 196 or less | 3.50 or less | JIS K 0102 40.2 |
| Lead and its compounds | 5.50 or less | 0.71 or less | 71.20 or less | 100000 or less | 120.00 or less | JIS K 0102 39.2 |
| Organo-phosphorous | 0 | 0.025 or less | 0.20 or less | 0.05 or less | 0.025 or less | Notice No. 13; Attached Table No. 2 |
| Hexavalent chromium compounds | 0.025 or less | 0.25 or less | 0.70 or less | 192 or less | 0.05 or less | JIS K 0102 51.2.1 |
| Arsenic or its compounds | 4.00 or less | 125 or less | 0.40 or less | 0.50 or less | 4.50 or less | JIS K 0102 48.2 |

TABLE-continued (Unit: mg/kg)

| Toxic substances | Waste[1] | | | | | Remarks: test method[2] |
|---|---|---|---|---|---|---|
| | Sludge (A) | Sludge (B) | Sludge (C) | Soot and dust | Waste electric apparatuses, appliances | |
| Cyano-compounds | 0.25 or less | 0.13 or less | 0.50 or less | 0.10 or less | 0.25 or less | JIS K 0102 29.2 |

Note:
[1]The contents of waste
Sludge (A): Sludge generated when molded products were glazed with ground slip of frit cadmium pigments.
Sludge (B): Sludge generated by grinding spectacles blanks.
Sludge (C): Neutralized sludge generated when waste gas in the production of sponge titanium was washed.
Soot and dust: Soot and dust obtained by collecting dust generated from a copper alloy casting furnace by a bag filter.
Waste electric apparatuses and appliances: Glass waste (in a powdery form) obtained by crashing recovered lamps and defectives in fluorescent lamp production steps.
[2]"Notice" in the test method is an abbreviation of "Notice of the Environment Agency."

The sulfur used as a material in the process of the present invention need not always be highly pure, and sulfur formed concomitantly in a process of desulfurization, for example, in plants that produce coke, make steel, or refine petroleum, and natural elemental sulfur, can serve well.

In the present invention, a material solidified with sulfur is composed of raw materials containing sulfur and the substance to be treated having the prescribed boiling point (the first and second embodiments) and, if necessary, solubility in the low-polar solvent which is eluted earlier than t-butanol (the first embodiment). Further, the material solidified with sulfur may be composed of, in addition to sulfur and an objective substance, a material selected from dust resulting particularly from metal processing such as steel-making, slag resulting particularly from metal processing such as steel-making, and other waste materials. With respect to the physical properties of the material solidified with sulfur, the specific gravity varies depending largely on the content of iron in the material aggregate. When the mixing ratio of sulfur and dust and/or slag resulting particularly from metal processing such as steel-making is varied to obtain desired materials solidified with sulfur, the relationship between the specific gravity of materials and the total iron content of the obtained materials solidified with sulfur is shown in Table 3 below, by way of example.

The total iron content of the dust and/or slag resulting particularly from metal processing such as steel-making out of the materials used in materials solidified with sulfur shown in Table 3 is mainly attributed to $Fe_2O_3$. For example, with regard to the total iron content (T—Fe) in dust resulting particularly from metal processing such as steel-making, the T—Fe of open hearth furnace dust is 45 to 68.5%, and the T—Fe in of converter dust is 62 to 63%. On the other hand, for example, with regard to the T—Fe in slag resulting particularly from metal processing such as steel-making, the T—Fe of open hearth furnace slag is 16.5 to 59%, and the T—Fe in converter slag is 24.6%, which T—Fe will vary depending on the pretreatment method.

In dust and/or slag resulting particularly from metal processing such as steel-making, the particle distribution has a range, and dust resulting particularly from metal processing such as steel-making has a maximum particle distribution of 0.07 to 1 mm, while slag resulting particularly from metal processing such as steel-making has a maximum particle distribution of 0.25 to 4 mm.

The physical strength of the material solidified with sulfur is influenced greatly by the width of the particle distribution of the used aggregate. Therefore, regarding such aggregates as slag and/or dust resulting particularly from metal processing such as steel-making, an optimum constitutional ratio ranging from fine particles to course particles is required for physical strength. Generally, by using an aggregate having a particle distribution in a larger particle diameter range, a material solidified with sulfur excellent in physical properties such as uniaxial compressive strength can be obtained. Examples of constitutional ratios related to uniaxial compressive strength are also shown in Table 3.

TABLE 3

| | | Amount of raw material to be used (part by weight) | | | | | Particle Size of the used raw material | | |
|---|---|---|---|---|---|---|---|---|---|
| | | Sulfer (1.98*[1]) | Dust resulting from steel-making (1.82–5.2*[1]) | Slag resulting from steel-making (2.04–5.2*[1]) | Specific gravity | T-Fe (%) | Dust resulting from steel-making (mm) | Slag resulting from steel-making (mm) | Uniaxial compressive strength (kg/cm$^2$) |
| | A1 | 2 (1.98*[2]) | 1 (2.72*[2]) | 5 (3.14*[2]) | 2.69 | 26.41 | 0.07–0.1 | 0.25–1.0 | 174 |
| | A2 | 2 (1.98*[2]) | 1 (2.72*[2]) | 5 (3.14*[2]) | 2.69 | 26.41 | 0.07–0.1 | 2.0–3.5 | 306 |

TABLE 3-continued

| | Amount of raw material to be used (part by weight) | | | | | Particle Size of the used raw material | | |
|---|---|---|---|---|---|---|---|---|
| | Sulfer (1.98*¹) | Dust resulting from steel-making (1.82–5.2*¹) | Slag resulting from steel-making (2.04–5.2*¹) | Specific gravity | T-Fe (%) | Dust resulting from steel-making (mm) | Slag resulting from steel-making (mm) | Uniaxial compressive strength (kg/cm²) |
| B1 | 1 (1.98*²) | 2 (3.86*²) | 2 (4.31*²) | 3.36 | 37.29 | 0.07–0.1 | 0.25–1.0 | 347 |
| B2 | 1 (1.98*²) | 2 (3.86*²) | 2 (4.31*²) | 3.36 | 37.29 | 0.07–0.1 | 2.0–3.5 | 478 |
| C1 | 1 (1.98*²) | 2 (5.09*²) | 3 (5.17*²) | 4.06 | 48.91 | 0.07–0.1 | 0.25–1.0 | 512 |
| C2 | 1 (1.98*²) | 2 (5.09*²) | 3 (5.17*²) | 4.06 | 48.91 | 0.07–0.1 | 2.0–3.5 | 650 |

Note:
*¹These values mean the range of specific gravity of each raw material.
*²These values mean specific gravity of the used raw material.

Hereinafter, the ratio of sulfur to the raw material other than sulfur will be described.

In the first embodiment of the present invention, the ratio of sulfur to the substance to be treated in the raw material mixture is not particularly restricted, and it may be in the range wherein the substance to be treated can be satisfactorily solidified and sealed in with sulfur. Specifically, the weight ratio of sulfur to the substance to be treated is preferably about $(1:1 \times 10^{-7})$ to $(1:1 \times 10^{-3})$.

Particularly, when the substance to be treated is PCBs, the weight ratio of sulfur to PCBs is preferably $(1:1 \times 10^{-7})$ to $(1:1 \times 10^{-3})$, more preferably $(1:1 \times 10^{-7})$ to $(1:5 \times 10^{-4})$, and particularly preferably $(1:1 \times 10^{-6})$ to $(1:1 \times 10^{-4})$. On the other hand, when the substance to be treated is dioxins, the weight ratio of sulfur to dioxins is preferably $(1:1 \times 10^{-7})$ to $(1:1 \times 10^{-3})$ more preferably $(1:1 \times 10^{-6})$ to $(1:5 \times 10^{-4})$, and particularly preferably $(1:1 \times 10^{-6})$ to $(1:1 \times 10^{-4})$.

In the first embodiment, the ratio of sulfur to the raw material containing the substance to be treated such as incineration ash and fly ash is not particularly restricted, and it may be in a range wherein the substance to be treated can be satisfactorily solidified and sealed in with sulfur. The weight ratio of sulfur to the raw material other than sulfur containing the substance to be treated is preferably (0.5:9.5) to (8:2), more preferably (1:9) to (7:3), and particularly preferably (1.7:8.3) to (5:5).

In the first embodiment, if an aggregate, such as slag and/or dust resulting particularly from metal processing such as steel-making, is additionally used, the ratio thereof is not particularly restricted, and it may be in the range wherein the substance to be treated can be satisfactorily solidified and sealed in with sulfur. Assuming the amount of sulfur to be 100 parts by weight, the amount to be used of the raw material other than sulfur containing the substance to be treated is preferably 2.5 to 1710 parts by weight, more preferably 4.3 to 810 parts by weight, and particularly preferably 10 to 440 parts by weight. On the other hand the amount to be used of an aggregate is preferably 1710 to 2.5 parts by weight, more preferably 810 to 4.3 parts by weight, and particularly preferably 440 to 10 parts by weight, for 100 parts by weight of sulfur.

In passing, in the first embodiment, when sulfur, the raw material other than sulfur containing the substance to be treated, slag resulting particularly from metal processing such as steel-making, and dust resulting particularly from metal processing such as steel-making are used, their ratio is not particularly restricted, and it may be in a range wherein the substance to be treated can be satisfactorily solidified and sealed in with sulfur. Assuming the amount of sulfur to be 100 parts by weight, the amount to be used of the raw material other than sulfur containing the substance to be treated is preferably 2.5 to 1710 parts by weight, more preferably 4.3 to 810 parts by weight, and particularly preferably 10 to 440 parts by weight. Assuming the amount of sulfur to be 100 parts by weight, the amount to be used of slag resulting particularly from metal processing such as steel-making is preferably 1700 to 0.025 parts by weight, more preferably 800 to 0.04 parts by weight, and particularly preferably 435 to 0.1 parts by weight. On the other hand, assuming the amount of sulfur to be 100 parts by weight, the amount to be used of dust resulting particularly from metal processing such as steel-making is preferably 0.025 to 1700 parts by weight, more preferably 0.04 to 800 parts by weight, and particularly preferably 0.1 to 435 parts by weight.

Parenthetically, in the case of using the raw material other than sulfur and containing the substance to be treated, the ratio of sulfur to the substance to be treated contained in the raw material is preferably in the range as defined above.

In the second and third embodiments of the present invention, the mixing ratio of sulfur with a material that is a solid or liquid state and is other than sulfur, such as slag and/or dust resulting particularly from metal processing such as steel-making and some other toxic substances or those containing toxic substances, is not particularly restricted as long as it falls in a range wherein toxic substances in the material other than sulfur are solidified and sealed in (encapsulated) satisfactorily with sulfur. The weight ratio of sulfur to the material other than sulfur is preferably (3:1) to (1:8), more preferably (3:7) to (1:5), even more preferably (1:3) to (1:5), and particularly preferably (1:4) to (1:5). When the amount of the material other than sulfur is small, that is, the amount of sulfur is rather a large amount, within the above-described range, all toxic substances which have a boiling point higher than the temperature necessary to melt sulfur (e.g. heavy metals, PCBs, DDT, dioxins, etc.) in the resulting solidified material can be more efficiently sealed in. It is also more easy to remelt and process the resulting solidified material. On the other hand, the smaller the amount of sulfur to be used within the above-described range is, the higher the specific gravity and physical strength of the resulting solidified material will be.

Materials to be used to make the solidified material in the present invention are preferably, (1) sulfur and slag resulting particularly from metal processing such as steel-making, and more preferably (2) sulfur, slag resulting particularly from metal processing such as steel-making and dust resulting particularly from metal processing such as steel-making. The ratio of the used amount of these materials are; in the case of (1), the amount of the slag resulting particularly from metal processing such as steel-making to sulfur of 100 parts by weight is preferably 100 to 1,500 parts by weight, more preferably 200 to 800 parts by weight, and particularly preferably 300 to 500 parts by weight; in the case of (2), the amount of the slag resulting particularly from metal processing such as steel-making to sulfur of 100 parts by weight is preferably 50 to 1,500 parts by weight, more preferably 50 to 500 parts by weight, and particularly preferably 100 to 300 parts by weight, and the amount of the dust resulting particularly from metal processing such as steel-making to sulfur of 100 parts by weight is preferably 30 to 900 parts by weight, more preferably 60 to 650 parts by weight, and particularly preferably 100 to 450 parts by weight. If slag resulting particularly from metal processing such as steel-making and dust resulting particularly from metal processing such as steel-making are excessive, the viscosity of the molten mixture may be lowered and the physical strength of the solidified item may also be lowered. Further, in that case, the mixing and melting of the material, such as slag resulting particularly from metal processing such as steel-making, and sulfur may become unsatisfactory, sometimes resulting in failure to seal in toxic substances. If the amounts of slag resulting particularly from metal processing such as steel-making and dust resulting particularly from metal processing such as steel-making are too small, the specific gravity of the solidified item may be decreased and the physical strength thereof may be lowered.

Furthermore, in the present invention, into the aggregate (solid raw material) to be mixed with molten sulfur, may be added shredder dust, in an amount that does not impair the properties of the sulfur-solidified material; for example, in an amount of about 55% by weight or below, and preferably 30% by weight or below, based on the aggregate. The term "shredder dust" means dust formed when waste automobiles or the like are crushed finely by a crusher for final disposal treatment, and shredder dust may take various forms, such as the forms of grinds and powdery dust. Components of shredder dust include, for example, resins, rubbers, fibers, foamed urethane, iron, mercury, lead, and paints, and particularly heavy metals. The materials contained in shredder dust present a problem with respect to waste material treatment.

Figure 2:
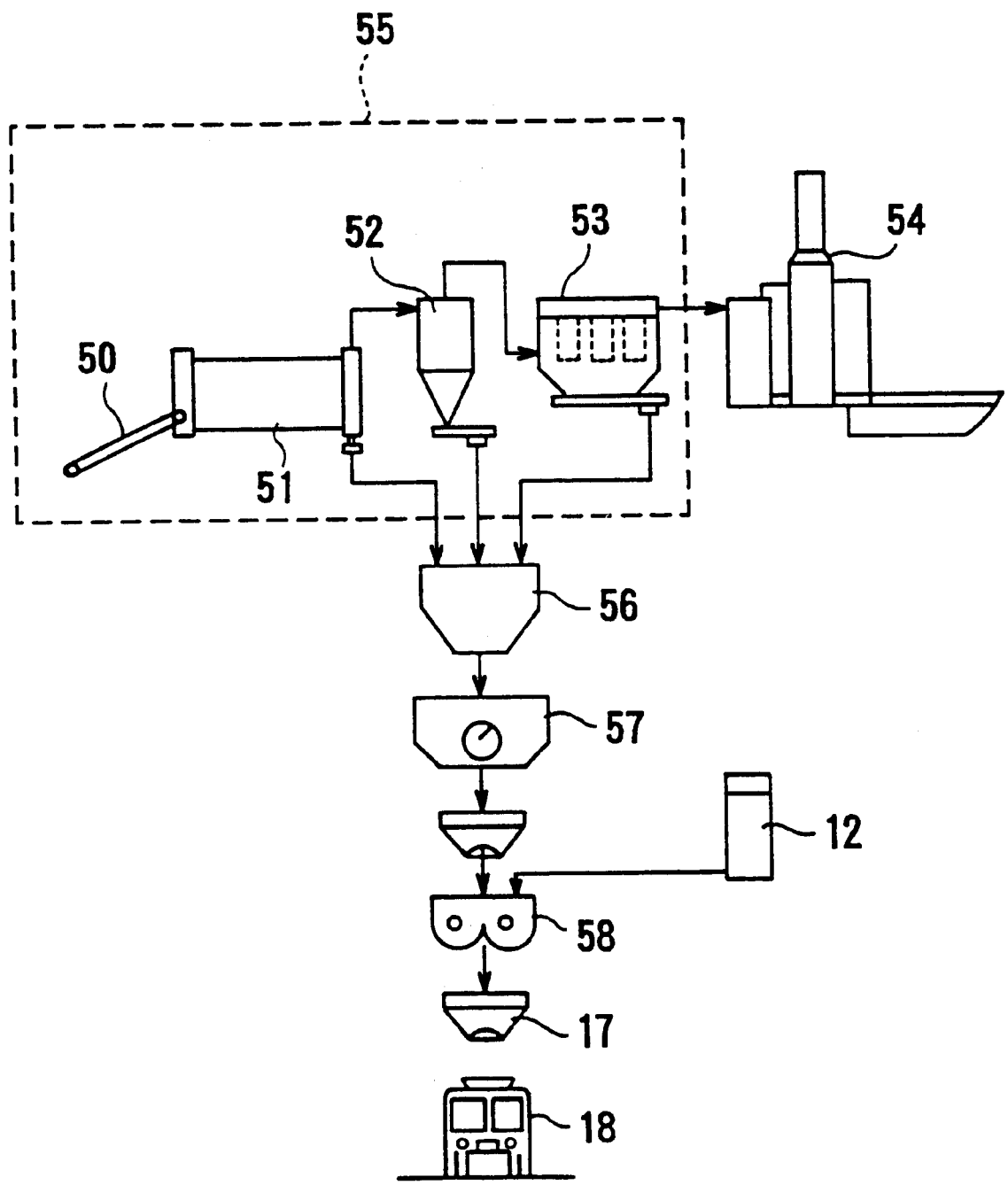
FIG. 2 is a view illustrating another embodiment of the apparatus for solidifying and sealing a toxic substance with sulfur.

Further, materials to be used other than sulfur; such as slag resulting particularly from metal processing such as steel-making, dust resulting particularly from metal processing such as steel-making, EP dust (that is, dust collected from electrostatic precipitator), and harmful-heavy-metal-containing sludge dried material (e.g. titanium waste slag), which materials contain a fine powder, are slashed in all directions in the practical processing step, in some cases. Since these contain toxic substances such as harmful heavy metals, it is required to provide an apparatus for removing the generation of secondary pollution. In this case, as shown in FIG. 2, three-step processing can be used, in such a manner that, after the material 50 is dried by a dryer 51, dust is removed by a cyclone 52; fine powder is removed by a bag filter 53; and finally a wet-type scrubber 54 is used for the purpose of deodorization and dust removal.

In the figure, section 55 within the broken-line is provided with juxtaposed rows, or three rows, in conformity with the purpose of application, i.e. for slag, dust, and waste materials (these may be substances to be treated).

In the figure, 56 indicates a hopper, 57 indicates a metering tank, and 58 indicates a mixer. In the figure, the same reference numerals indicate the same members as described in FIG. 1.

The present invention is now described in more detail based on the following examples, but, of course, the present invention is not limited to these examples.

EXAMPLES

Example 1

A. Solidification with Sulfur

By using the following materials, materials solidified with sulfur were produced.

(1) Slag Resulting from Steel-making 500 g of so-called converter slag was prepared.

Particle diameter: 4.0 to 0.25 mm gradually cooled slag (ID-C3)

Water content: shown below

Bulk specific gravity: 2.04 g/cm$^2$

T—Fe: 58.8%

(2) Dust Resulting from Steel-making 400 g was prepared.

Particle diameter: 1.0 to 0.25 mm magnetically separated powder (LD-OB)

Water content: shown below

Bulk specific gravity: 1.82 g/cm$^2$

T—Fe: 59.8%

(3) Sulfur

In this particular example, sulfur obtained in desulfurization in refining of petroleum, which sulfur had a purity of 99.5% or over, was used, in an amount of 400 g. Naturally, this type of sulfur was free from moisture. Generally this sulfur is stored in a liquefied state by heating it to 120±5° C.

Before mixing and melting the sulfur, the water content of the slag resulting from steel-making and the dust resulting from steel-making was brought to less than 1% by weight, less than 3% by weight, about 7% by weight, or about 10% by weight, respectively, based on the total amount, and they were mixed. The three components were added approximately simultaneously and were mixed at 120 to 130° C. for 20 min, using a double-screw pug mill-type circulation kneader. The thus obtained molded (gradually cooled) materials were tested with respect to leaching out of heavy metals and physical strength, according to the following methods. Further, the specific gravity of the thus obtained molded materials was measured.

B. Testing Method (1) Test Method for Leaching Out of Heavy Metals

Each of the obtained molded materials solidified with sulfur was ground to particles, and the obtained particles were passed through a sieve to collect the particles having particle diameter of 0.5 to 5 mm, to prepare Sample. The thus prepared Sample was brought into pure water which had its pH value adjusted to 5.8 or higher but 6.3 or below, so that the content of Sample became 10% (w/v) and the total amount of the mixture of Sample in water was made to at least 500 ml. This mixture was stirred at 20° C by using a stirrer, the width of stirring being 4 cm or more but 5 cm or less at stirring speed of 200 times/min. for 6 hours, thereby to carry out leaching out of heavy metals from the molded material solidified with sulfur into water. The resulting liquid was filtered through a filter having a pore diameter of 1 μm, to prepare Test liquid. Leaching out of each heavy metal in the Test liquid was measured according to the method described in the notification No. 13 from the Environment Agency, such as the atomic absorption spectrometry shown in JIS K 0102.

With respect to the degree of pollution for the criteria for soil environment, the measurement was carried out according to the method described in the notification No. 46 from the Environment Agency, by using Sample prepared in the same manner as described above except that the particle diameter of Sample was made 2 mm or less.

(2) Test Method for Physical Strength

As a scale of physical strength of Sample, uniaxial compressive strength of each sample prepared in the above (1) was measured according to JIS A 1108. The results are shown in Table 4.

TABLE 4

| Experiment No. | 1 | 2 | 3 | 4 |
|---|---|---|---|---|
| Water content (wt. %) | less than 1% | less than 3% | about 7% | about 10% |
| State at the time of mixing | Mixing and melting could be done with little abnormality | | During the mixing and melting, foaming occurred within the mixture | |
| Generated gas | During the mixing and melting, there was little generation of an irritating odor | | During the mixing and melting, an irritating odor due to the smell of sulfur dioxide gas was remarkably generated, and therefore a deodorizing apparatus was required to be installed | |
| Leaching out of heavy metals* | Leaching out of heavy metals from the material solidified by sulfur into water was little | | Leaching out of heavy metals from the material solidified by sulfur become much and components in amounts exceeding the criteria for waste leached out | |
| | At or below the criteria for soil environment | At or below the criteria for leaching of harmful heavy metals, etc. | Some components of Zn, As, Pb, etc. exceeded the criteria for leaching out of harmful heavy metals | |
| | Hg <0.0005 mg/l | Hg <0.005 mg/l | Hg 0.005 to 0.01 mg/l | |
| | Pb <0.01 mg/l | Pb <0.3 mg/l | Pb 0.3 to 0.5 mg/l | |
| | As <0.01 | As <0.3 | As 0.3 to 0.5 mg/l | |
| Uniaxial compressive strength | 300 kg/cm$^2$ | 280 kg/cm$^2$ | 200 kg/cm$^2$ | 180 kg/cm$^2$ |
| Specific gravity | 3.51 | 3.28 | 2.34 | 2.11 |

Note:
*Leaching-out amounts of heavy metals from the raw materials before solidifying with sulfur are Hg 0.005 mg/l; Pb 3.0 mg/l; and As 1.0 mg/l.
"<" means much smaller than the amount, e.g. <0.0005 mg/l means that it was much smaller than 0.0005 mg/l.

In Experiment Nos. 1 and 2, a rise in viscosity under melting condition during mixing occurred remarkably, whereas in, Experiment Nos. 3 and 4, a rise in viscosity under melting condition did not occur due to the water content.

When three components, i.e. dust and slag resulting from steel-making, and sulfur, were mixed, with the water content before the mixing and melting being over 3%, it happened that steam and sulfurous acid gas were generated by heating at a temperature higher than 120° C., and the inner pore spaces in the mixed material were greatly increased, which seemed to result in lower physical strength. As a result, in such a system wherein water remained significantly in the solid raw material, the penetration of liquid sulfur into the solid phase became unsatisfactory. When the molded material solidified with sulfur was broken and the broken materials were shaken in water, by the method of judging the suppression of leaching out of toxic heavy metals, it was recognized that toxic heavy metals leached out.

As is apparent from the results shown in Table 4, if the water content at the time of mixing and melting exceeds 3%, an irritating odor due to the smell of sulfurous acid gas became strong, the uniaxial compressive strength of the material solidified with sulfur was under the same conditions, the leaching out of heavy metals could not be prevented, and therefore it can be understood that it is important to control the initial water content.

Example 2

Molded materials were manufactured in the same manner as Experiment No. 1 in Example 1, except that raw materials or their composition were changed as shown in Table 5 below. Physical properties of the molded materials were measured in the same manner as in Example 1. The results are shown in Table 5.

TABLE 5

| | Amount of raw material to be used (part by weight) | | | | | | | |
|---|---|---|---|---|---|---|---|---|
| Experiment No. | Sulfur | Dust resulting from steel-making | Slag resulting from steel-making | Gravel | Macadam | Fly ash*[1] | Specific gravity | Uniaxial compressive strength |
| 5*[2] | 1 | 2 | 3 | — | — | — | 4.06 | 650 kg/cm$^2$ |
| 6 | 1 | — | — | 2 | 3 | — | 2.50 | 128 kg/cm$^2$ |
| 7 | 1 | — | — | — | — | 5 | 2.31 | 68 kg/cm$^2$ |

TABLE 5-continued

| | | Amount of raw material to be used (part by weight) | | | | | | |
|---|---|---|---|---|---|---|---|---|
| Experiment No. | Sulfur | Dust resulting from steel-making | Slag resulting from steel-making | Gravel | Macadam | Fly ash*1 | Specific gravity | Uniaxial compressive strength |
| 8 | 1 | — | 5 | — | — | — | 2.12 | 27 kg/cm$^2$ |

Note:
*1 The fly ash used had a water content of less than 3%.
*2 In Experiment No. 5, the raw materials and composition were the same as those described in column C2 in Table 3.

Example 3

Materials

The sulfur, slag resulting from steel-making, and dust resulting from steel-making used in Example 3 (as well as in the following examples), were prepared in the same manner as in Example 1.

PCB Reagents

The PCB reagents used in the example were four commercially available PCB standard substances: Kanechlor KC-300, KC-400, KC-500, and KC-600 (trade names), manufactured by G.L. Science Co., which were different in the degree of chlorination.

| Type of PCB reagent Trade name | Concentration (g/ml) |
|---|---|
| Kanechlor KC-300 | 651.0 |
| Kanechlor KC-400 | 603.5 |
| Kanechlor KC-500 | 534.0 |
| Kanechlor KC-600 | 594.0 |

PCBs are soluble in hexane (the solubility at ordinary temperature is about 200 mg/l or more) but are slightly soluble in water. The solubility of PCBs in water at 25° C. is about 0.3 mg/l (assuming PCBs as a mixture of PCBs each having 3 to 6 chlorine atoms), and when PCBs have smaller number of chlorine atoms, the solubility is about 1 mg/l. PCBs have a boiling range of about 325 to about 420° C. (760 mmHg), which range may vary due to the number of chlorine atoms (3 to 6 chlorine atoms) in the PCB mixture.

To a mixture having the mixing ratio of 900 g of slag resulting from steel-making and 600 g of dust resulting from steel-making, each of which was a dehydrated solid having a water content of less than 3% by weight, and 555 g of sulfur (2,055 g in all), was added a hexane solution (50 ml) containing a PCB mixture (Kanechlor KC-300 3.84 ml, Kanechlor KC-400 4.14 ml, Kanechlor KC-500 4.68 ml, and Kanechlor KC-600 4.21 ml; totaling about 10 mg in terms of PCBs); the mixture was stirred and heated to evaporate the hexane, and after the stirring was continued to sufficiently mix for about 15 min or more at a temperature of 135 to 145° C., the mixture was plunged into water, to form a water-granulated solid (slag). The water-granulated slag had a specific gravity of 3.2 g/cm$^3$ and a monoaxial compression strength of 460 kg/cm$^2$.

As a leaching-out test for the leaching-out of PCBs from the water-granulated slag, an assay was made for a measurement certificate (method of measurement: JIS K 0093) in accordance with Notice No. 13 of the Environment Agency, and the assay showed a leached-out amount less than the detection limit value of 0.0005 mg/l, and it was judged that PCBs were not detected.

Example 4

900 g of slag resulting from steel-making, which was a dehydrated solid having an water content of less than 3% by weight, 600 g of dust resulting from steel-making, which was a dehydrated solid having an water content of less than 3% by weight, and 660 g of sulfur (totaling to 2,160 g) were mixed and were made into a product solidified with sulfur by water granulation.

Separately, a hexane solution (50 ml) of a PCB mixture (Kanechlor KC-300 0.39 ml, Kanechlor KC-400 0.41 ml, Kanechlor KC-500 0.047 ml, and Kanechlor KC-600 0.42 ml) was prepared, wherein the amount of PCBs was about 1 mg.

This hexane solution of a PCB mixture was added to the above product solidified with sulfur (water-granulated product), and the resulting mixture was heated to 60 to 80° C., to evaporate the hexane. Then, the mixture was heated to 130 to 140° C., to be brought to a melted state, and after mixing for about 10 min, it was allowed to stand to cool and solidify at room temperature. This was used as a sample. This sample (gradually-cooled solidified product) had a specific gravity of 3.1 g/cm$^3$ and a monoaxial compression strength of 440 kg/cm$^2$.

Next, the sample was ground until all particles of the sample passed through a 2-mm sieve. The sample passed through the sieve was added to pure water (having a pH of 5.8 to 6.8), whose amount was ten times that of the sample, thereby preparing a sample liquid.

The sample liquid was shaken as follows: the number of shakes, 200 per min; the width of the shakes, 4 cm or more but 5 cm or below; and the time of the shaking, 6 hours.

After the thus shaken sample liquid was allowed to stand for about 10 to 30 min, the supernatant liquid was centrifuged at about 3,000 rpm for 20 min, and the resulting supernatant liquid was passed through a 0.45-$\mu$m membrane filter, to obtain an analyte liquid.

The thus obtained analyte liquid was subjected to the leaching-out test for PCBs.

The result of the leaching-out test showed a leached-out amount less than 0.0005 mg/l (less than the detection limit).

Example 5

1500 g of slag resulting from steel-making, and 500 g of dust resulting from steel-making, each of which was a dehydrated solid having a water content of less than 3% by weight, and 410 g of sulfur were mixed and were made into a product solidified with sulfur by water granulation. A hexane solution (50 ml) of a PCB mixture (Kanechlor KC-300, Kanechlor KC-400, Kanechlor KC-500, and Kanechlor KC-600, 5 ml of each, totaling 20 ml i.e. about 11.9mg in total amounts of PCBs) separately prepared was added to the above product solidified with sulfur (water-granulated product), and the resulting mixture was heated to 60 to 80° C., to evaporate the hexane. Then, the mixture was heated to 130 to 140° C., to be brought to a melted state, and after mixing for about 10 min, it was allowed to stand to cool and solidify at room temperature, to obtain a sample. This sample (gradually-cooled solidified product) had a specific gravity of 3.2 g/cm$^3$ and a monoaxial compression strength of 640 kg/cm$^2$. The sample was processed and subjected to the leaching-out test in the same manner as in Example 4. The result of the leaching-out test showed a leached-out amount less than 0.0005 mg/l (less than the detection limit).

Example 6

A hexane solution (50 ml) of a PCB mixture (Kanechlor KC-300, Kanechlor KC-400, Kanechlor KC-500, and Kanechlor KC-600, 5 ml of each, totaling 20 ml, i.e. about 11.9 mg in terms of PCBS) was added to 500 g of sulfur. The mixture was heated to 60 to 80° C., to evaporate the hexane. Then the mixture was heated to 130 to 140° C., to be brought to a melted state, and after mixing for about 10 min, it was allowed to stand to cool and solidify at room temperature, to obtain a sample. This sample (gradually-cooled solidified product) had a specific gravity of 1.9 g/cm$^3$ and a monoaxial compression strength of 20 kg/cm$^2$. This sample was treated and subjected to the leaching-out test in the same manner as in Example 4.

The result of the leaching-out test showed a leached-out amount less than 0.0005 mg/l (less than the detection limit).

Example 7

A sample was obtained in the same manner as in Example 5, except that a hexane solution (50 ml) of a PCB mixture (Kanechlor KC-300, Kanechlor KC-400, Kanechlor KC-500, and Kanechlor KC-600, 10 ml of each, totaling 40 ml, i.e. about 23.7 mg in terms of PCBs) was added to 500 g of sulfur. This sample (gradually-cooled solidified product) had a specific gravity of 1.9 g/cm$^3$ and a monoaxial compression strength of 20 kg/cm$^2$. This sample was treated and subjected to the leaching-out test in the same manner as in Example 5, and the result showed a leached-out amount less than 0.0005 mg/l or less (less than the detection limit).

Comparative Example 1

300 g of slag resulting from steel-making and 200 g of dust resulting from steel-making were mixed, heated, and dried, to obtain a powder having a water content less than 3% by weight, and a hexane solution (50 ml) of a PCB mixture (Kanechlor KC-300, Kanechlor KC-400, Kanechlor KC-500, and Kanechlor KC-600, 5 ml of each, totaling 20 ml, i.e. about 11.9 mg in terms of PCBS) was added to the powder. The mixture was heated to 60 to 80° C., to evaporate the hexane. Then the mixture was heated to 130° C., and after stirring for 10 min, it was allowed to stand to cool and solidify at room temperature, to obtain a sample. This sample (powder product) had a specific gravity of 2.2 g/cm$^3$. This sample was treated and subjected to the leaching-out test in the same manner as in Example 4. The result of the leaching-out test showed a leached-out amount of less than 0.0005 mg/l (less than the detection limit).

Comparative Example 2

300 g of slag resulting from steel-making and 200 g of dust resulting from steel-making were mixed, heated, and dried, to obtain a powder having a water content of less than 3% by weight, and a hexane solution (50 ml) of a PCB mixture (Kanechlor KC-300, Kanechlor KC-400, Kanechlor KC-500, and Kanechlor KC-600, 10 ml of each, totaling 40 ml, i.e. about 23.7 mg in terms of PCBS) was added to the powder. Thereafter the mixture was treated in the same manner as in Comparative Example 1, to obtain a sample. This sample (garadually-cooled powder product) had a specific gravity of 2.2 g/cm$^3$. This sample was treated and subjected to the leaching-out test in the same manner as in Comparative Example 1, and the result showed a detection of PCBs with a leached-out amount of 0.003 mg/l (the detection limit being 0.0005 mg/l).

From the above results, it can be seen that, in the solidified materials obtained by using sulfur, slag resulting from steel-making, and dust resulting from steel-making in accordance with the method of the present invention, PCBs were completely solidified and sealed in (Examples 3, 4 and 5). It can be understood that, similarly in the solidified products obtained by using sulfur in accordance with the method of the present invention, PCBs were completely solidified and sealed in (Examples 6 and 7). In contrast, in the cases in which slag resulting from steel-making and dust resulting from steel-making were used without using sulfur, solidification and sealing in were possible if the amount of added PCBs was small (Comparative Example 1), but PCBs were not sealed in and they leached out if the amount of added PCBs was increased (Comparative Example 2). From Comparative Examples 1 and 2, it can be understood that PCBs can be sealed in with using slag and dust resulting from steel-making that can be used as subsidiary materials in the method of the present invention by taking them into pores of the slag and dust resulting from steel-making even if sulfur is not used, but if the amount of PCBs is increased, PCBs cannot be sealed in, resulting in the leaching-out thereof.

Example 8

900 g of slag resulting from steel-making, which is a dehydrated solid having a water content of less than 3% by weight, 600 g of dust resulting from steel-making, which is a dehydrated solid having a water content of less than 3% by weight, and 660 g of sulfur (2,160 g in all) are mixed and are water-granulated, to produce a material solidified with sulfur.

Separately, a toluene solution of 1 mg of a dioxin standard substance (as an equivalence (TEQ) to 2,3,7,8,-T$_4$CDD) is prepared.

This dioxin toluene solution is added to the above sulfur-solidified material (water-granulated product), and the mixture is heated to 100 to 115° C., to evaporate the toluene. Further, the mixture is heated to 130 to 140° C., to be brought to a melted state, and after mixing for about 10 min, the melted mixture is allowed to stand to cool and solidify at room temperature. The resulting product is used as a sample. Thereafter the sample is treated in the same manner as in Example 4 and is subjected to a dioxin leaching-out test.

By the leaching-out test, dioxins are not detected.

Example 9

A toluene solution (50 ml) of 10 mg of dioxins is added to 500 g of sulfur. Then, the mixture is heated to 100 to 115° C., to evaporate the toluene, and then it is heated to 130 to 140° C., to be brought to a melted state, and after mixing for about 10 min, the mixture is allowed to stand to cool and solidify at room temperature, to obtain a sample. Thereafter the sample is treated in the same manner as in Example 8 and is subjected to the dioxin leaching-out test.

As a result of the leaching-out test, the leached-out amount is less than the detection limit.

Comparative Example 3

From 900 g of slag resulting from steel-making and 600 g of dust resulting from steel-making, each of which was a dehydrated solid having a water content of less than 3% by weight, and 660 g of sulfur (2,160 g in all), a material solidified with sulfur was produced by water-granulating in the same manner as in Example 3.

Separately, a hexane (100 ml) dispersion solution of 10 mg of diethylene glycol was prepared.

This hexane dispersion solution of diethylene glycol was added to the above sulfur-solidified material (water-granulated product), and the mixture was heated to 60 to 80° C., to evaporate the hexane. Further, the mixture was heated to 130 to 140° C., to be brought to a melted state, and after mixing for about 10 min, the melted mixture was allowed to stand to cool and solidify at room temperature. The resulting product was used as a sample. Thereafter the sample was treated in the same manner as in Example 3 and was subjected to a leaching-out test for diethylene glycol.

As a result of the leaching-out test, 3 mg/l of diethylene glycol was detected.

Herein, diethylene glycol is not soluble in the low-polar solvents, such as benzene, toluene, carbon tetrachloride and chloroform; but it has solubility characteristics in and is miscible arbitrarily with solvents (not low in polarity), such as water, alcohols, ethers and acetone. The boiling point of diethylene glycol is 245° C. (133° C./14 mmHg).

In another embodiment, the present invention is a method for manufacturing materials solidified with sulfur, and a system of sealing in all toxic substances which have a boiling point higher than the temperature necessary to melt sulfur such as harmful heavy metal species, PCBs, DDT, dioxins, comprising providing a raw material to be mixed with the sulfur, reducing the water content of the raw material, such as slag resulting particularly from metal processing such as steel-making and/or dust resulting particularly from metal processing such as steel-making, to approximately less than 3% by weight, mixing the material with the sulfur to produce a mixture of materials, heating the mixture of raw materials including molten sulfur at a temperature in the range of approximately 119 to 159° C., to cause the melted sulfur to penetrate into apertures on the raw material that is solid or to cause the melted sulfur to mix with and seal the raw material that is liquid, and then, if necessary, molding the mixture of raw materials into a shape or cooled into a granular form.

In another further embodiment, an apparatus for manufacturing materials solidified with sulfur, which apparatus is preferable to carry out the present invention, comprises a heating and drying device for reducing the water content of a raw material to be mixed with the sulfur, such as slag resulting particularly from metal processing such as steel-making and/or dust resulting particularly from metal processing such as steel-making, a means for heating and mixing the mixture of raw materials including molten sulfur, and, if necessary, a means for molding the mixture of materials into a shape or cooled into a granular form.

According to the present invention, a solid or liquid material, such as slag resulting particularly from metal processing such as steel-making, and/or dust resulting particularly from metal processing such as steel-making and dust from incinerated waste materials, can be solidified and sealed in with sulfur quite effectively and positively, at the same time, by suppressing the occurrence of sulfurous acid gas during heating to melt, and a material solidified with sulfur that is high in physical strength can be obtained. In particular, according to the present invention, from waste materials containing toxic substances such as harmful heavy metal species, PCBs, DDT, dioxins, a material solidified with sulfur from which the leaching out of toxic substances such as harmful heavy metals species, PCBs, DDT and dioxins, is completely prevented, can be obtained. Additionally, the materials solidified with sulfur which have a high specific gravity and a high physical strength can be useful as ballasting materials. The materials solidified with sulfur can be used as a raw material to produce molded articles further processed.

The apparatus for manufacturing materials for use in the present invention to produce an item solidified with sulfur can be made to run in a continuous manner. Alternatively, in order to obtain a material in a granular form, to meet the purpose of application of the sulfur-solidified material, an apparatus may be chosen in which a motor-driven sieve is placed downstream of the path of the flow of the fluid mixture (at 120 to 140° C.), to form particles with sizes in conformity with the openings of the sieve, and the particles are plunged into water to be solidified (water-granulated). A movable heat-resistant belt conveyor may also be placed below the sieve, to allow particles with desired sizes to be grouped, gradually cooled, and solidified, thereby producing gradually-cooled and granular-formed materials solidified with sulfur.

According to water granulation, the fluid mixture having a high temperature (120 to 140° C.) is abruptly cooled with water which can be crushed, and a sulfur-solidified material, most of whose masses have sides 50 mm or below in size, is obtained. The water-granulated sulfur-solidified material is small in particle diameter and can be crushed further to about sizes of sand grains, and the shapes of the obtained granules are not uniform and resemble the shapes of crushed coke. The physical strength of the masses of the sulfur-solidified material obtained by water granulation is low, and therefore the masses can be crushed easily to smaller sizes, to be used as a fine aggregate (sand-like particles: 0.3 to 5 mm). Since the water-granulated sulfur-solidified material is not uniform in particle diameter, and the outer surface of the granules is rugged, if the water-granulated sulfur-solidified material is added to sand or gravel, the resulting mixture can be very easily made compact and is preferable, for example, as a high-load-bearing earth filling material for beaches.

On the other hand, according to gradual cooling, the solidified material after the cooling becomes a single mass, which has a high specific gravity and a high physical strength. When the mass is crushed and the sizes of the particles are chosen, a coarse aggregate (5 to 40 mm) can be obtained. Since the gradually-cooled sulfur-solidified material has a high physical strength and a large specific gravity, it can be used, for example, as a filler in concrete caissons.

When the sulfur-solidified material resulting from water-granulation or gradual-cooling as it is, or the granularly-formed or finely-crushed solidified material, is heated to 120° C. to 140° C. (but not higher), it can be easily remelted and fluidized. The remelted sulfur-solidified material can be easily molded into a shape; for example, into a plate or a cylinder, such as a stake or a pile, by pouring it into a mold. In this case, if the product is a large-sized product small in surface area, that is, for example, one obtained by gradual-cooling, since the heat conductivity is small, it is resistant to being remelted. Therefore, it is sometimes necessary to be made into a finely crushed form as described above.

Additional examples of waste materials containing hazardous- or toxic-substances, which can be used in the present invention, include waste materials containing toxic substances; soil contaminated with PCBs, DDT, dioxins, heavy metals and other toxic substances; dust (collected dust) released from metal-melting, refineries, and the like; dust (sludge) resulting from the treatment of waste water; dust or bottom ash resulting from incinerating residential or commercial garbage; ground materials of defective electric apparatuses and appliances resulting from the production of electric apparatuses and appliances; ground materials of waste electric apparatuses and appliances (e.g. fluorescent lamps and batteries) retrieved from the market; and many other types of waste materials and toxic substances, including all solid or liquid forms of inorganic or organic toxic substances. The inorganic toxic substances include the atomic or molecular substances and matters containing these substances. These can be used with other raw materials such as the substance to be treated and dust and/or slag resulting particularly from metal processing such as steel-making, unless the objects of the invention are affected. Further, the amount of these to be used may be generally 5 to 95% by weight in the total solid raw materials including other raw materials such as the substance to be treated and dust and/or slag resulting particularly from metal processing such as steel-making.

The sulfur used as a material in the process of the present invention need not always be highly pure, and sulfur formed concomitantly in a process of desulfurization, for example, in plants that produce coke, make steel, or refine petroleum, and natural elemental sulfur, can serve well.

In still a further embodiment, the present invention relates to a process for safe disposal of matter, including, but not limited to, all toxic substances and other hazardous substances, each of which (i) have a boiling point higher than the temperature necessary to melt sulfur and (ii) the solubility characteristics in a low-polar solvent that elutes earlier than t-butanol when eluted from a silica gel column, into a form that renders the matter: (1) non-toxic, in the case of a toxic substance, in that the leaching thereof is eliminated, and in some cases (2), in addition to the above (1), reusable as a base material in granular or various molded forms. The process includes using sulfur for the disposal, encapsulation, containment, processing, treating, destruction and immobilizing, and if necessary recycling, of waste materials and all toxic substances which have (i) a boiling point higher than the temperature necessary to melt sulfur and (ii) the solubility characteristics in a low-polar solvent that elutes earlier than t-butanol when eluted from a silica gel column.

The sulfur may include sulfur-based materials, sulfur-based compounds and sulfur-based substances for the safe disposal of waste materials and all toxic substances which have (i) a boiling point greater than the temperature needed to melt sulfur and (ii) the solubility characteristics in a low-polar solvent that elutes earlier than t-butanol when eluted from a silica gel column including all inorganic toxic substances and all organic toxic substances with (i) a boiling point greater than the temperature needed to melt sulfur and (ii) the solubility characteristics in a low-polar solvent that elutes earlier than t-butanol when eluted from a silica gel column.

Having described the present invention as related to the present embodiments, it is the present inventor's intention that the invention not be limited by any of the details of the description, unless otherwise specified, but rather be construed broadly within its spirit and scope as set out in the accompanying claims.

What we claim is:

1. A process for safe disposal of all toxic substances, the process comprising the steps of:
    (a) providing a sulfur-based material;
    (b) mixing said sulfur-based material with said toxic substances;
    (c) reducing the water content of said mixture;
    (d) heating said mixture to approximately between 130 to 159° C.; and
    (e) cooling said mixture,
    wherein the weight ratio of sulfur to toxic substance is in the range of about $1:1\times10^{-7}$ to $1:1\times10^{-3}$,
    wherein said mixture in step (e) is non-toxic, and wherein said toxic substances have a boiling point higher than the temperature necessary to melt sulfur and the solubility characteristics in a low-polar solvent, the low-polar solvent being eluted earlier than t-butanol when eluted from a silica gel column.

2. The process in accordance with claim 1 wherein said toxic substances includes all inorganic toxic substances with a boiling point greater than the temperature necessary to melt sulfur and the solubility characteristics in a low-polar solvent, the low-polar solvent being eluted earlier than t-butanol when eluted from a silica gel column.

3. The process in accordance with claim 1 wherein said toxic substances includes all organic toxic substances with a boiling point greater than the temperature necessary to melt sulfur and the solubility characteristics in a low-polar solvent, the low-polar solvent being eluted earlier than t-butanol when eluted from a silica gel column.

4. The process in accordance with claim 1 wherein the process further comprises molding said mixture in the step (e), wherein said resulting mixture is non-toxic and reusable.

5. A process for safe disposal of all toxic substances, the process comprising the steps of:
    (a) providing a sulfur-based compound;
    (b) mixing said sulfur-based compound with said toxic substances;
    (c) reducing the water content of said mixture;
    (d) heating said mixture to approximately between 130 to 159° C.; and
    (e) cooling said mixture,
    wherein the weight ratio of sulfur to toxic substance is in the range of about $1:1\times10^{-7}$ to $1:1\times10^{-3}$,
    wherein said mixture in step (e) is non-toxic, and wherein said toxic substances have a boiling point higher than the temperature necessary to melt sulfur and the solubility characteristics in a low-polar solvent, the low-polar solvent being eluted earlier than t-butanol when eluted from a silica gel column.

6. The process in accordance with claim 5 wherein said toxic substances includes all inorganic toxic substances which have a boiling point greater than the temperature necessary to melt sulfur and the solubility characteristics in a low-polar solvent, the low-polar solvent being eluted earlier than t-butanol when eluted from a silica gel column.

7. The process in accordance with claim 5 wherein said toxic substances includes all organic toxic substances which have a boiling point greater than the temperature necessary to melt sulfur and the solubility characteristics in a low-polar solvent, the low-polar solvent being eluted earlier than t-butanol when eluted from a silica gel column.

8. The process in accordance with claim 5 wherein the process further comprises molding said mixture in the step (e), wherein said resulting mixture is non-toxic and reusable.

9. A process for safe disposal of all toxic substances, the process comprising the steps of:
(a) providing a sulfur-based substance;
(b) mixing said sulfur-based substance with said toxic substances;
(c) reducing the water content of said mixture;
(d) heating said mixture to approximately between 130 to 159° C.; and
(e) cooling said mixture,
wherein the weight ratio of sulfur to toxic substance is in the range of about $1:1\times10^{-7}$ to $1:1\times10^{-3}$,
wherein said mixture in step (e) is non-toxic, and wherein said toxic substances have a boiling point higher than the temperature necessary to melt sulfur and the solubility characteristics in a low-polar solvent, the low-polar solvent being eluted earlier than t-butanol when eluted from a silica gel column.

10. The process in accordance with claim 9 wherein said toxic substances includes all inorganic toxic substances which have a boiling point greater than the temperature necessary to melt sulfur and the solubility characteristics in a low-polar solvent, the low-polar solvent being eluted earlier than t-butanol when eluted from a silica gel column.

11. The process in accordance with claim 9 wherein said toxic substances includes all organic toxic substances which have a boiling point greater than the temperature necessary to melt sulfur and the solubility characteristics in a low-polar solvent, the low-polar solvent being eluted earlier than t-butanol when eluted from a silica gel column.

12. The process in accordance with claim 9 wherein the process further comprises molding said mixture in the step (e), wherein said resulting mixture is non-toxic and reusable.

13. A process for safe disposal of all toxic substances, the process comprising the steps of:
(a) providing sulfur;
(b) mixing said sulfur with said toxic substances;
(c) reducing the water content of said mixture;
(d) heating said mixture to approximately between 130 to 159° C.; and
(e) cooling said mixture,
wherein the weight ratio of sulfur to toxic substance is in the range of about $1:1\times10^{-7}$ to $1:1\times10^{-3}$,
wherein said mixture in step (e) is non-toxic, and wherein said toxic substances have a boiling point higher than the temperature necessary to melt sulfur and the solubility characteristics in a low-polar solvent, the low-polar solvent being eluted earlier than t-butanol when eluted from a silica gel column.

14. The process in accordance with claim 13 wherein said toxic substances includes all inorganic toxic substances which have a boiling point greater than the temperature necessary to melt sulfur and the solubility characteristics in a low-polar solvent, the low-polar solvent being eluted earlier than t-butanol when eluted from a silica gel column.

15. The process in accordance with claim 13 wherein said toxic substances includes all organic toxic substances which have a boiling point greater than the temperature necessary to melt sulfur and the solubility characteristics in a low-polar solvent, the low-polar solvent being eluted earlier than t-butanol when eluted from a silica gel column.

16. The process in accordance with claim 13 wherein the process further comprises molding said mixture in the step (e), wherein said resulting mixture is non-toxic and reusable.

17. The process in accordance with claim 13 wherein said sulfur is provided by sulfur-based materials.

18. The method in accordance with claim 13 wherein said sulfur is provided by sulfur-based compounds.

19. The method in accordance with claim 13 wherein said sulfur is provided by sulfur-based substances.

* * * * *